US009642202B2

(12) United States Patent
Li et al.

(10) Patent No.: US 9,642,202 B2
(45) Date of Patent: *May 2, 2017

(54) SYSTEMS AND METHODS FOR DIMMING OF A LIGHT SOURCE

(71) Applicant: ECOSENSE LIGHTING INC., New York, NY (US)

(72) Inventors: Hang Fai Li, Ma On Shan (HK); Ping Ho Yee, Kwai Chung (HK); Hoi Kuen Chan, Fanling (HK); Chiu Ho Wong, Kowloon (HK)

(73) Assignee: ECOSENSE LIGHTING INC., Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/049,457

(22) Filed: Feb. 22, 2016

(65) Prior Publication Data

US 2016/0174319 A1 Jun. 16, 2016

Related U.S. Application Data

(63) Continuation of application No. 14/106,581, filed on Dec. 13, 2013, now Pat. No. 9,307,588.
(Continued)

(51) Int. Cl.
H05B 41/16 (2006.01)
H05B 41/24 (2006.01)
H05B 33/08 (2006.01)

(52) U.S. Cl.
CPC ..... H05B 33/0845 (2013.01); H05B 33/0803 (2013.01); H05B 33/0815 (2013.01); Y02B 20/345 (2013.01); Y02B 20/46 (2013.01)

(58) Field of Classification Search
USPC .................................................. 315/219–312
See application file for complete search history.

(56) References Cited

U.S. PATENT DOCUMENTS 3,989,976 A 11/1976 Tabor
4,870,327 A 9/1989 Jorgensen
(Continued)

FOREIGN PATENT DOCUMENTS

WO 2009120555 A1 10/2009
WO 2010016002 A1 2/2010

OTHER PUBLICATIONS

Bush, Steve, "Chip gives dim-to-warm LED lighting without MCU," dated Apr. 1, 2014, downloaded from http://www.electronicsweekly.com/news/components/led-lighting/chip-gives-dim-warm-led-lighting-without-mcu-2014-04/, 6pp.
(Continued)

Primary Examiner — Brandon S Cole
(74) Attorney, Agent, or Firm — Jay M. Brown

(57) ABSTRACT

In embodiments, improved capabilities are described for dimming performance of lighting methods and systems, such as the improvement of dimming LED lamps that are dimmed from standard external dimming devices. Methods and systems for improving dimming performance include a fast startup override facility for overriding a default dimming function of the lamp's electronics through forcing the lamp electronics to operate with a higher than normal duty cycle to ensure the lamp electronics can deliver higher than normal power to an LED module during a dimming current level startup condition. Dimming facilities may also include a dynamic RC selection facility, an active N-level bleeder facility, a dimmer-type detection facility, an improved dimming linearity through symmetrical phase cutting facility, and a flicker reduction facility.

24 Claims, 33 Drawing Sheets

Related U.S. Application Data

(60) Provisional application No. 61/737,957, filed on Dec. 17, 2012, provisional application No. 61/763,268, filed on Feb. 11, 2013.

(56) References Cited

U.S. PATENT DOCUMENTS

| | | | |
|---|---|---|---|
| 5,691,605 | A | 11/1997 | Xia et al. |
| 6,051,940 | A | 4/2000 | Arun |
| 6,124,673 | A | 9/2000 | Bishop |
| 6,570,505 | B1 * | 5/2003 | Malenfant ............. G08G 1/095 307/108 |
| 6,946,806 | B1 | 9/2005 | Choi |
| 7,038,594 | B2 * | 5/2006 | Voreis ................ H05B 33/0815 315/224 |
| 7,288,902 | B1 | 10/2007 | Melanson |
| 7,759,881 | B1 * | 7/2010 | Melanson .......... H05B 33/0815 315/224 |
| 8,547,024 | B2 | 10/2013 | Grotkowski et al. |
| 8,593,129 | B2 | 11/2013 | Gaknoki et al. |
| 8,614,551 | B2 | 12/2013 | Chen et al. |
| 8,749,173 | B1 | 6/2014 | Melanson et al. |
| 8,754,584 | B2 | 6/2014 | Chen et al. |
| 8,829,802 | B2 | 9/2014 | Wei et al. |
| 8,829,819 | B1 | 9/2014 | Angeles et al. |
| 8,970,135 | B2 | 3/2015 | Zheng et al. |
| 9,018,847 | B2 | 4/2015 | Yu et al. |
| 9,055,629 | B2 | 6/2015 | Chen et al. |
| 9,084,325 | B2 | 7/2015 | Zheng et al. |
| 9,220,145 | B2 | 12/2015 | Brandt |
| 9,282,608 | B2 | 3/2016 | Yau et al. |
| 9,450,505 | B2 | 9/2016 | Siessegger et al. |
| 9,485,833 | B2 | 11/2016 | Datta et al. |
| 9,489,005 | B2 | 11/2016 | Hausman, Jr. et al. |
| 9,538,618 | B2 | 1/2017 | Taipale et al. |
| 2004/0184264 | A1 | 9/2004 | Elam et al. |
| 2006/0001381 | A1 | 1/2006 | Robinson et al. |
| 2008/0224631 | A1 | 9/2008 | Melanson |
| 2008/0303456 | A1 * | 12/2008 | Sun ................... H05B 33/0815 315/308 |
| 2009/0167203 | A1 | 7/2009 | Dahlman et al. |
| 2009/0195168 | A1 | 8/2009 | Greenfeld |
| 2009/0236997 | A1 | 9/2009 | Liu |
| 2009/0243582 | A1 | 10/2009 | Irissou et al. |
| 2010/0019697 | A1 * | 1/2010 | Korsunsky ......... H05B 33/0818 315/307 |
| 2010/0060202 | A1 | 3/2010 | Melanson et al. |
| 2010/0141178 | A1 | 6/2010 | Negrette et al. |
| 2010/0171145 | A1 | 7/2010 | Morgan et al. |
| 2011/0043129 | A1 | 2/2011 | Koolen |
| 2011/0043137 | A1 | 2/2011 | Negley et al. |
| 2011/0084614 | A1 | 4/2011 | Eisele et al. |
| 2011/0140620 | A1 | 6/2011 | Lin et al. |
| 2011/0175528 | A1 | 7/2011 | Rains, Jr. et al. |
| 2011/0193490 | A1 | 8/2011 | Kumar |
| 2011/0254525 | A1 | 10/2011 | Gaknoki et al. |
| 2011/0285308 | A1 | 11/2011 | Crystal et al. |
| 2012/0004509 | A1 | 1/2012 | De Lucia |
| 2012/0062152 | A1 | 3/2012 | Sanfilippo et al. |
| 2012/0092902 | A1 | 4/2012 | Gaknoki et al. |
| 2012/0098505 | A1 | 4/2012 | Irissou et al. |
| 2012/0256548 | A1 | 10/2012 | Collins et al. |
| 2012/0280629 | A1 | 11/2012 | Gaknoki et al. |
| 2012/0287097 | A1 | 11/2012 | Akiyama et al. |
| 2012/0299501 | A1 | 11/2012 | Kost et al. |
| 2013/0026942 | A1 * | 1/2013 | Ryan .................. H05B 37/0272 315/224 |
| 2013/0049603 | A1 | 2/2013 | Bradford |
| 2013/0069561 | A1 | 3/2013 | Melanson et al. |
| 2013/0077299 | A1 | 3/2013 | Hussell et al. |
| 2013/0147385 | A1 | 6/2013 | Yang et al. |
| 2013/0241440 | A1 | 9/2013 | Gaknoki et al. |
| 2013/0300309 | A1 | 11/2013 | Melanson |
| 2014/0049241 | A1 | 2/2014 | Gaknoki et al. |
| 2014/0062330 | A1 * | 3/2014 | Neundorfer .......... H05B 39/044 315/224 |
| 2014/0167646 | A1 | 6/2014 | Zukauskas et al. |
| 2014/0217907 | A1 | 8/2014 | Harris |
| 2014/0265935 | A1 | 9/2014 | Sadwick et al. |
| 2014/0361701 | A1 | 12/2014 | Siessegger et al. |
| 2015/0062892 | A1 | 3/2015 | Krames et al. |
| 2016/0135265 | A1 | 5/2016 | Eum et al. |

OTHER PUBLICATIONS

"Aculux—Black Body Dimming and Tunable White Responsive Technologies," downloaded on May 28, 2014 from http://www.junolightinggroup.com/literature/LIT-AX-LED-BBD-TW.pdf, 28pp.

"LEDnovation—BR30 Warm Dimming," downloaded on May 28, 2014 from www.lednovation.com/products/BR30_LED.asp, 2pp.

"A Warmer, Cozier White Light: NXP Transforms LED Color Quality," dated Jan. 9, 2013, downloaded from http://www.nxp.com/news/press-releases/2013/01/a-warmer-cozier-white-light-nxp-transforms-led-color-quality.html, 2pp.

"Philips Lighting—Dim Tone,", downloaded on May 27, 2014 from www.usa.lighting.philips.com/lightcommunity/trends/led/dimtone/, 1p.

"Philips—Dimmable to warm light for the perfect ambience," downloaded on May 27, 2014 from www.usa.lighting.philips.com, 2pp.

"Philips—Turn up Ambience and Tone Down Energy Use with Philips BR30 DimTone," downloaded on May 27, 2014 from www.usa.lighting.philips.com, 11pp.

"Sylvania ULTRA SE(tm) LED Light Bulbs with Color Dimming Sunset Effects," downloaded on May 27, 2014 from https://www.youtube.com/watch?v=oZEc-VfJ8EU, 2pp.

"Sylvania—ULTRA SE(tm) LED Lamp Family," downloaded on May 27, 2014 from www.sylvania.com, 3pp.

"USAI Lighting Catalog," downloaded on May 27, 2014 from http://www.usaillumination.com/pdf/Warm_Glow_Dimming.pdf, 50pp.

Cree, "Cree(r) LMH2 LED Modules," Product Family Data Sheet, downloaded on May 27, 2014 from http://www.cree.com/~/media/Files/Cree/LED%20Components%20and%20Modules/Modules/Data%20Sheets/LEDModules_LMH2.pdf, 18pp.

Petluri et al., U.S. Appl. No. 14/526,504, filed Oct. 28, 2014, entitled "Lighting Systems Having Multiple Light Sources," 92pp.

Homsi, PCT International patent application No. PCT/US2017/013636, filed on Jan. 16, 2017, 83 pp.

PCT/US2012/060588, International Preliminary Report on Patentability, dated Apr. 22, 2014, 6pp.

PCT/US2013/075172, International Preliminary Report on Patentability, dated Jun. 23, 2015, 8pp.

* cited by examiner

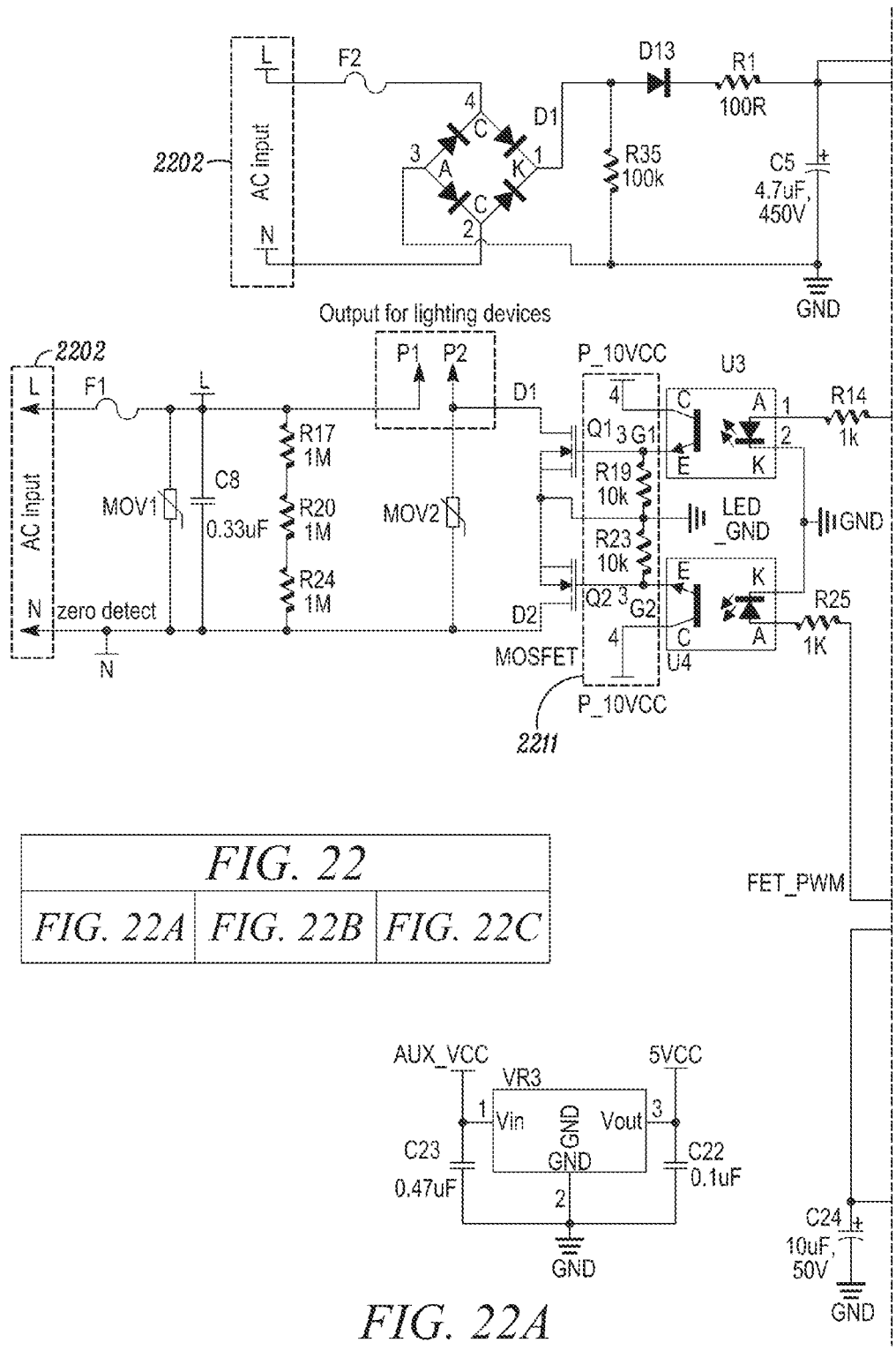

SYSTEMS AND METHODS FOR DIMMING OF A LIGHT SOURCE

CROSS-REFERENCE TO RELATED APPLICATIONS

This application is a continuation of U.S. Nonprovisional application Ser. No. 14/106,581, filed Dec. 13, 2013.

U.S. Nonprovisional application Ser. No. 14/106,581 claims the benefit of the following provisional applications, which are hereby incorporated by reference in their entirety: U.S. Provisional Application 61/737,957 filed Dec. 17, 2012, and U.S. Provisional Application 61/763,268 filed Feb. 11, 2013.

BACKGROUND

Field

This invention relates to light sources, and more particularly to the dimming of light sources and lighting fixtures thereof.

Description of Related Art

Dimming of a light source has wide applications in many areas. The light sources may be incandescent, fluorescent, LEDs, and the like. Nowadays, non-incandescent lamps are becoming popular, where ideally a replacement lamp should be compatible with existing electrical circuits, including existing dimming circuits such as leading edge and trailing edge type dimming circuits. However, the characteristics of the non-incandescent lamps may not be purely resistive, as in the case of an incandescent light bulb. This, along with differences in the properties among dimming types, dictates that the compatibility with existing dimming circuits is still a challenge for designers of lighting systems. Therefore there is a need for new and improved systems and methods for implementation of the dimming of lamps from existing dimming circuits. In addition, the dimming linearity of leading edge and trailing edge dimmers is not matched to the perception of human eyes, and so the linearly of dimmable lighting also needs to be improved. Therefore a need exists for improvement in the performance of dimming of a light source.

SUMMARY

The present disclosure describes methods and systems for improving the dimming performance of lighting systems, such as the improvement of dimming LED lamps that are dimmed from standard external dimming devices. Methods and systems for improving dimming performance include a fast startup override facility, a dynamic RC selection facility, an active N-level bleeder facility, a dimmer-type detection facility, an improved dimming linearity through symmetrical phase cutting facility, and a flicker reduction facility. The fast startup override facility may override information of a dimming function (e.g., such as through a dimming pin of an LED driver) of the lamp's electronics through forcing the lamp electronics to operate with a higher than normal duty cycle to ensure the lamp electronics can deliver higher than normal power to an LED module during a dimming current level startup condition. The dynamic RC selection facility may allow the RC network being used in an average voltage method to have a varying response under different conditions. The active N-Level bleeder facility may reduce flickering by intelligently changing active dummy resistance loads (bleeder) to the AC line through an active N-Level bleeder facility. The system may introduce an N-level bleeder by automatically selecting an appropriate dummy resistance load at different dimming current levels so that the holding current of a TRIAC in an external dimming device can be maintained when the light source. The dimmer-type detection facility may provide information for improved performance of dimming facilities. The improved dimming linearity through symmetrical phase cutting facility may improve linearity with respect to the human eye's response to light. An embodiment phase cut method for dimming starts to cut the conduction at 90 degrees of the sine wave, and then expands symmetrically up and down from the 90-degree starting point. This is as opposed to a traditional rising or trailing edge technique, where the progressively increasing cut is made in an asymmetric manner. A flicker reduction facility may be utilized to help reduce the potential for lamp flicker in conjunction with circuit components for reducing EMI. The presence of a differential mode filter inductor for EMI reduction, in combination with circuit capacitance, may create ripples that then causes flicker. By introducing an additional LC circuit, high frequency harmonics can be reduced, thus reducing the ripple, and the flicker.

In embodiments, a system for dimming a lamp may comprise a lamp electronics facility with an operational duty cycle and providing power to a lamp light source, wherein the lamp electronics facility is adapted to accept a dimming input signal to control a default dimming function, the dimming input signal at least in part derived from a dimming device that is external to the lamp; and a fast startup dimming control override facility that overrides the dimming input signal during startup of the lamp to override the default dimming function through forcing the lamp electronics to operate with a higher than operational duty cycle to deliver higher than operational power to the lamp light source during a dimming current level startup condition, the dimming current level startup condition representing a current level to the lamp light source that is less than the current required to produce an illumination level by the lamp light source that corresponds to the dimming input signal, wherein the override condition is removed when an operational current level required to produce an illumination level by the lamp light source that corresponds to the dimming input signal to the lamp light source is reached. In embodiments, the lamp may be an LED lamp. A dynamic RC network circuit may be provided comprising a capacitor and a resistor, where the value of the capacitor is dynamically changed in response to different dimming input signal conditions. The value of the capacitor may be dynamically decreased to bypass the resistor at startup of the lamp. A dimmer-type detection circuit may be provided to detect the use of a leading edge dimmer circuit in the dimming device, where upon detection of the leading edge dimmer circuit the RC network circuit is connected to the dimming input. An active N-level bleeder may be provided that automatically selects an appropriate resistance load at different dimming current levels to maintain a holding current for the dimming device as a function of the dimming input signal. A dimmer-type detection circuit may be provided as an auto-selector for selecting the appropriate resistance load to be more accurately based on the type of dimmer being used in the dimming device. A flicker reduction circuit may be provided comprising first inductor and a capacitor in the lamp electronics whose values are selected so as to provide a differential mode filter function for EMI reduction, and a second inductor and a resistor in the lamp electronics whose values are selected in combination with the first inductor and the capacitor to decrease high frequency harmonics for flicker reduction.

In embodiments, a method for dimming a lamp may comprise operating a lamp electronics facility with an operational duty cycle that provides power to a lamp light source, wherein the lamp electronics facility is adapted to accept a dimming input signal to control a default dimming function, the dimming input signal at least in part derived from a dimming device that is external to the lamp; overriding the default dimming function with a fast startup dimming control override condition that overrides the dimming input signal during startup of the lamp through forcing the lamp electronics to operate with a higher than operational duty cycle to deliver higher than operational power to the lamp light source during a dimming current level startup condition, the dimming current level startup condition representing a current level to the lamp light source that is less than the current required to produce an illumination level by the lamp light source that corresponds to the dimming input signal; and removing the startup dimming control override condition when an operational current level required to produce an illumination level by the lamp light source that corresponds to the dimming input signal to the lamp light source is reached. In embodiments, the lamp may be an LED lamp. A dynamic RC network circuit may be provided comprising a capacitor and a resistor, where the value of the capacitor is dynamically changed in response to different dimming input signal conditions. The value of the capacitor may be dynamically decreased to bypass the resistor at startup of the lamp. A dimmer-type detection circuit may be provided to detect the use of a leading edge dimmer circuit in the dimming device, where upon detection of the leading edge dimmer circuit the RC network circuit is connected to the dimming input. An active N-level bleeder may be provided that automatically selects an appropriate resistance load at different dimming current levels to maintain a holding current for the dimming device as a function of the dimming input signal. A dimmer-type detection circuit may be provided as an auto-selector for selecting the appropriate resistance load to be more accurately based on the type of dimmer being used in the dimming device. A flicker reduction circuit may be provided comprising first inductor and a capacitor in the lamp electronics whose values are selected so as to provide a differential mode filter function for EMI reduction, and a second inductor and a resistor in the lamp electronics whose values are selected in combination with the first inductor and the capacitor to decrease high frequency harmonics for flicker reduction.

In embodiments, a system for dimming a light source may comprise an interface to an external A.C. mains power signal; a dimming module receiving an external dimming signal, where the dimming module compares the external dimming signal to an internal periodic reference signal, and averages the resulting comparison signal to generate an internal dimming signal; an A.C. zero-crossing detector that produces a zero-crossing detection signal from monitoring the interface to external A.C. mains power; a dimming controller that receives the internal dimming signal and the zero-crossing detection signal, wherein the dimming controller generates a first and second pulse-width modulated drive signal that is dependent upon polarity of the external A.C. mains power signal, where the first pulse-width modulated drive signal switches during the positive phase of the external A.C. mains power signal and the second pulse-width modulated drive signal switches during the negative phase of the external A.C. mains power signal; a switching facility that switches power to the light source, wherein the switching facility is comprised of a first and second power switching circuit that receive the first and second pulse-width modulated drive signals, the first power switching circuit switching power to the light source during the positive phase of the external A.C. mains power signal and the second power switching circuit switching power to the light source during the negative phase of the external A.C. mains power signal; and a dimming controller that generates the first and second pulse width modulated signal in proportion to symmetrically cutting at a conduction angle starting at 90 degrees of the external A.C. mains power signal to dim the light source and increasing symmetrically up and down from 90 degrees in response to the external dimming signal to control the luminance of light source, wherein the resulting dimming of the light source has a good match with the human eye's response in dimming linearity.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIGS. 22A, 22B and 22C depict an embodiment circuit diagram of the phase cut method.

While the invention has been described in connection with certain preferred embodiments, other embodiments would be understood by one of ordinary skill in the art and are encompassed herein.

DETAILED DESCRIPTION

Figure 1:
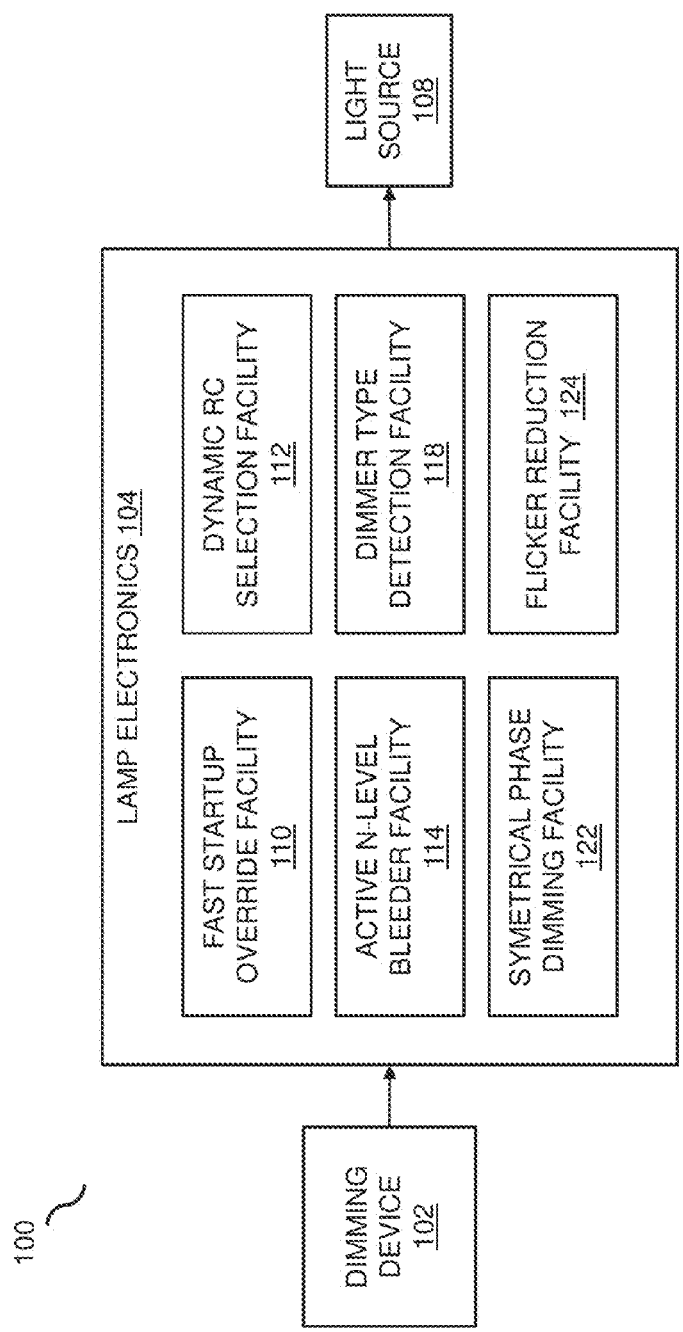
FIG. 1 depicts the block diagram of a dimmable light system.

This disclosure provides embodiments that improve the performance for dimming of a light source. FIG. 1 presents a block diagram of a dimmable lamp 100, such as including lamp electronics 104 with at least one of a fast startup override facility 110, dynamic RC selection facility 112, active N-level bleeder facility 114, dimmer type detection facility 118, symmetrical phase dimming facility 122, flicker reduction facility 124, and the like, for improving the dimming performance of the lamp when varying the brightness of the light source 108 through use of a dimming device 102. The dimmable lamp 100 may be a 'light bulb' that mounts into a lighting fixture, a lighting fixture, and the like. The lamp may be utilized with various types of dimming devices 102, such as including leading or trailing edge dimmable lighting drivers by input by any wired and wireless input signal, such as utilizing a variable resistor, 0-10V lighting control, a Digital Addressable Lighting Interface (DALI), WiFi control, and the like. The dimming device 102 may be integral with the lamp (e.g., a dimming switch integrated with a fixture or in the base of the lamp), or may be an external dimming device (e.g., a wall dimmer). The lamp 100 may utilize a plurality of light sources 108, such as LEDs, florescent lamp technologies, induction lamp technologies, and the like. Although LED lamps may be used to describe dimming performance improvement embodiments within the present disclosure, one skilled in the art will appreciate that the facilities described herein may be used in conjunction with other lighting source technologies.

In embodiments, an LED lamp may be used as an example of incompatibilities between non-incandescent lamps and traditional dimming devices 102. To understand the compatibility issue, it is necessary to understand the properties of LEDs. The LED operates as an ideal diode rather than a resistor. The current applied and where the voltage is clamped by a diode control the brightness of the LED. For the traditional dimmer, a TRIAC or MOSFET is used to control the conduction angle and the AC voltage applied to the unit. The incandescent light bulb operates as a pure resistor and so operates properly with a standard dimmer. However, the diode property of the LED makes the LED driver malfunction if the driver doesn't have a signal that is synchronous with the LED current. Therefore, most of the dimmable LED controllers have a sense pin to detect the conduction angle by means of either a direct phase angle detection or an average method to make the driving current of the LED synchronous with the conduction angle.

Figure 2:
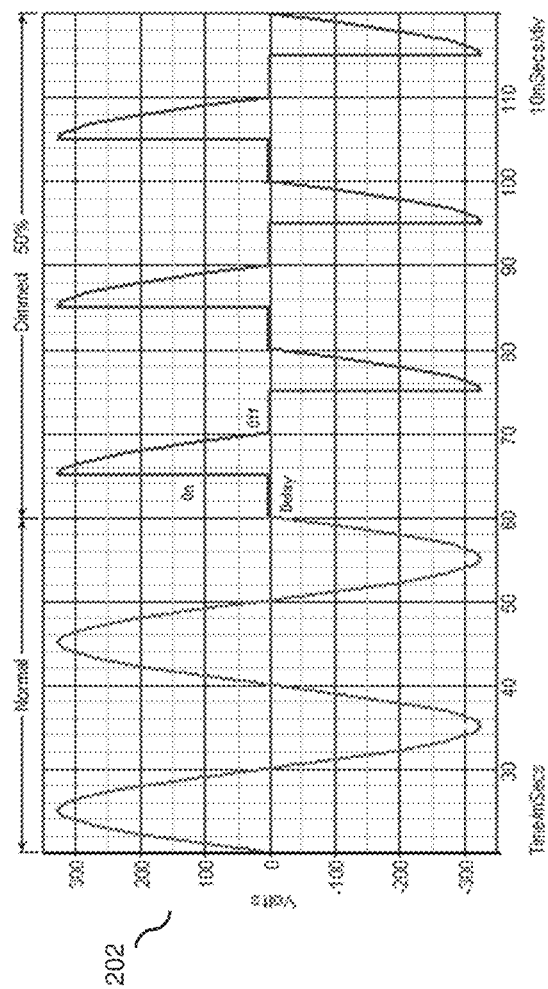
FIG. 2 depicts a leading edge dimmer waveform and circuit representative of the prior art.
Figure 2:
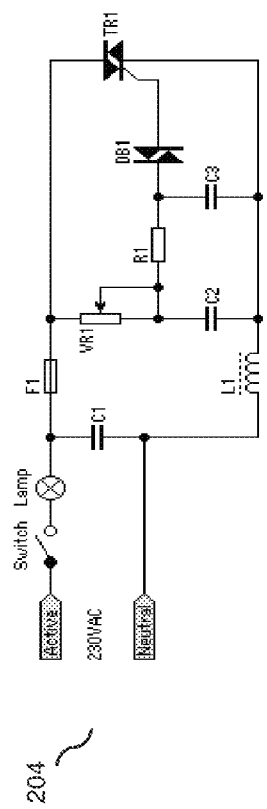
Figure 3:
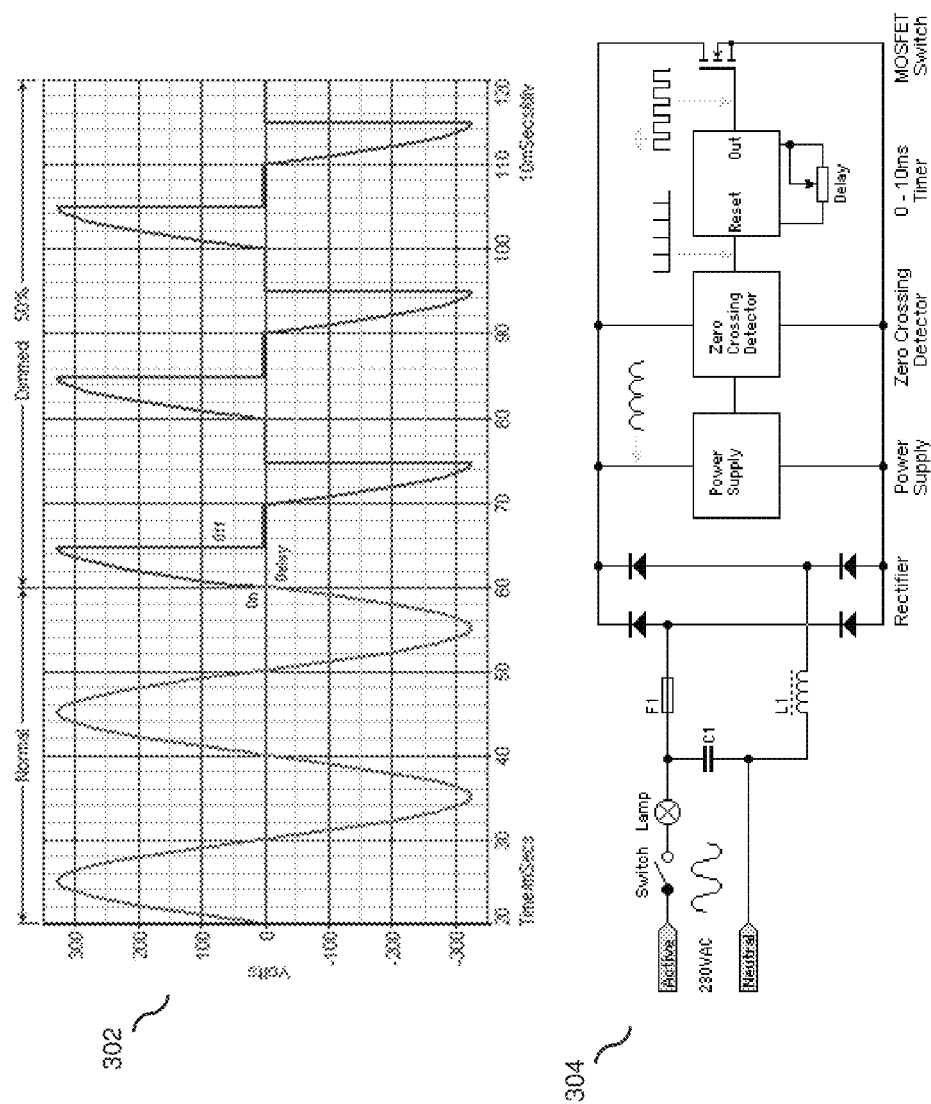
FIG. 3 depicts a trailing edge dimmer waveform and circuit representative of the prior art.

Traditional dimmers are designed to work with incandescent light bulbs. Therefore, a new LED driver has to be designed to work properly with the existing system. Unfortunately, Leading Edge dimmers and Trailing Edge dimmers have different configurations with different properties. FIG. 2 presents a representative waveform 202 and circuit 204 for a leading edge dimmer, using a DIAC to drive the TRIAC to cut the conduction angle. As a holding current is required with a TRIAC, it is difficult to match with LED loads, where the conduction of the TRIAC should be maintained with a certain holding current. The driving current of the LEDs is also too low, which leads to on-off flickering. FIG. 3 presents a representative waveform 302 and circuit 304 for a trailing edge dimmer. The circuit is more complex compared with the leading edge dimmer, using zero crossing technology and MOSFET to control the conduction angle. In this configuration, there is not a holding current problem.

Generally, as the trailing edge dimmer uses a MOSFET to control the conduction angle without the holding current requirement as in a TRIAC in a leading edge dimmer, most of the LED divers could obtain good performance upon dimming. But such products could not be easily compatible with a leading edge dimmer. In contrast, leading edge dimmer compatible products may not be compatible with the trailing edge dimmer products if the design is improper, thus causing a perceptible LEDs flickering. Therefore, achieving compatibility with both leading edge and trailing edge dimmers remains a challenge. Besides, as mentioned, most ICs use either direct conduction angle detection or an average voltage method to determine the driving current of the LED, and so the linearity or startup response would be poor. These incompatibilities would be an issue for users considering changing their incandescent light bulbs to LED lighting products.

Due to the different configurations of different types of dimmers and the detection method of Dimmable LED Driver ICs, existing dimmable LED drivers have a number of problems. For instance, it is difficult to be compatible when using both leading edge (TRIAC) and trailing edge (ELV) dimmers when trying to achieve the performance of an incandescent light bulb. LED flickering likely occurs in a low dimming current output when a leading edge dimmer is used. The LED is slow to start up at low dimming conditions if an average method for conduction angle detection is used. Also, dimming range and linearity are poor, dimming response is slow, and LED start up synchronization is poor.

Figure 4A:
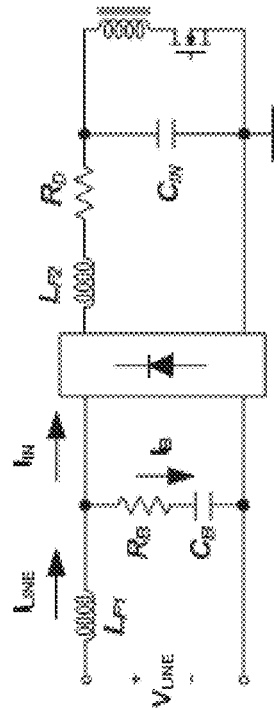
FIG. 4A depicts a passive bleeder circuit representative of the prior art.
Figure 4B:
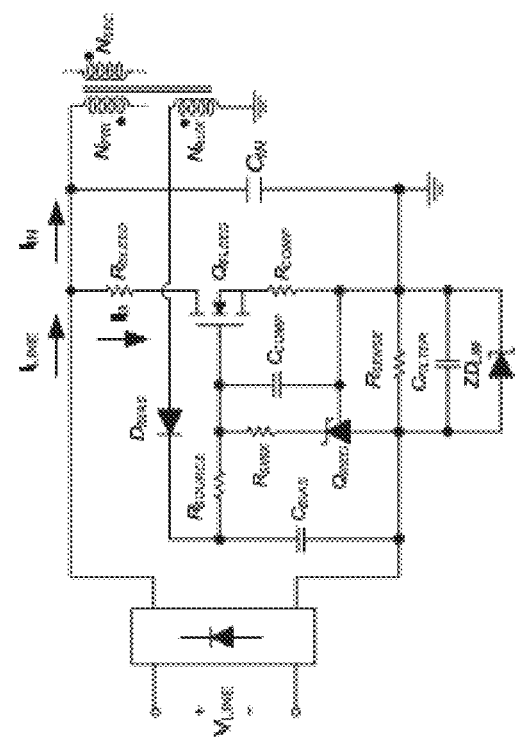
FIG. 4B depicts an active bleeder circuit representative of the prior art.

Prior art methods for maintaining a holding current with a leading edge circuits include the use of a bleeder resistor, such as a passive bleeder or an active bleeder. FIG. 4A presents a representative passive bleeder 402 in the prior art, using a resistor $R_B$ and capacitor $C_B$ as a passive load to the dimmer to maintain the holding current. Disadvantages of this configuration include power loss being very large for a wide range application, and it affects the harmonics when the capacitance is too large. FIG. 4B presents a representative single active bleeder 404, which improves power loss at full condition. However, the configuration is less feasible for a full dimming range and for all types of dimmers (i.e. leading and trailing edge dimmers). It is also prone to flickering when the input current is close to the predesigned level, especially for trailing edge dimmers due to the bleeder on and off cycle being uneven.

Figure 5:
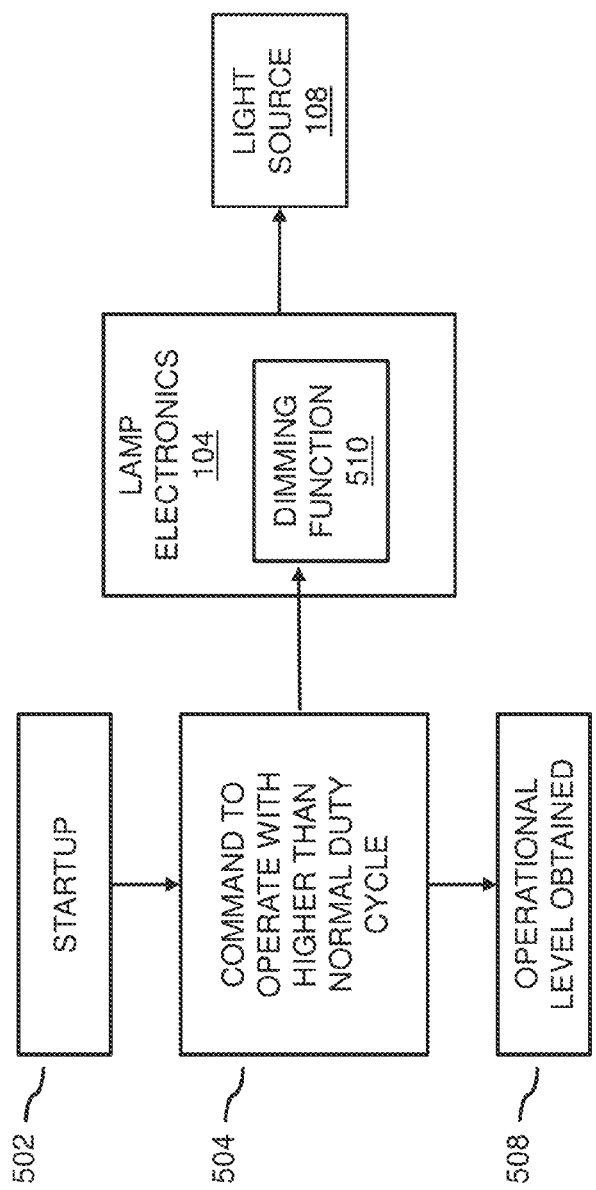
FIG. 5 depicts a block diagram for overriding a dimming pin functionality of an LED driver in an embodiment of the present invention.

In embodiments, the present system may provide for an improved solution for slow LED start up at low dimming conditions through a fast startup override facility 110. Generally, there is a dimming pin (e.g., analog or PWM input) in a dimmable LED driver. It detects the conduction angle by either direct conduction angle detection or average voltage method. Referring to FIG. 5, the present system may override the information of a dimming function 510 (e.g., such as through a dimming pin of an LED driver) of the lamp electronics 104 through forcing the lamp electronics to operate with a higher than normal duty cycle to ensure the lamp electronics can deliver higher than normal power to an LED module during a dimming current level startup condition. The system may detect the LED voltage in order to determine whether to remove the higher than normal duty command to allow the lamp electronics to be operated normally. For instance, at startup 502, an auxiliary voltage level may be used as a signal to detect an LED module voltage, where a command to operate with higher than normal duty cycle 504 is then applied. Once, the LED module voltage is higher than a certain level, and an operational level obtained 508, the lamp electronics may be able to ensure the LED module can light up even if the lamp electronics 104 removes the higher than normal duty cycle command, where the system may remove the override control to allow the LED driver to operate with the dimming pin normally.

When the average voltage method is used in conjunction with the operation of the dimming function 510, an RC network may be used to determine the conduction angle of the applied AC voltage. For instance, when the applied AC is a high voltage, the network resistance has to be larger, and the capacitance may be too small to minimize the line ripple to affect the current to LED module as flickering. However, increasing the value of the capacitance produces a larger RC constant, which leads to a larger charging time, producing a slow start up, such as at low dimming current conditions. To speed up the process, the lamp electronics 104 may utilize a dynamic RC selection facility 112 that allows the RC network to have a varying response under different conditions. For example, the lamp electronics may dynamically decrease the capacitance in the RC network to bypass the resistor at start up condition. Advantages may include a faster LED startup, improved startup under varying input phase angle, faster dimming response, improved synchronization of the LED light-up with different LED drivers and different power levels, and the like.

The dimming lamp 100 may provide for compatibility with a dimming device 102 that utilizes either leading edge or trailing edge dimmers. For example, most current dimmable LED drivers have an active bleeder to maintain the holding current of the TRIAC by using an input current sensing method, where once the input current level is lower than a predesigned level the bleeder is switched on. As this is a single level bleeder, it would likely generate flickering due to the bleeder on and off and heavy dummy resistance used for minimizing low level dimming flickering. In embodiments, the system may reduce flickering by intelligently changing active dummy resistance loads (bleeder) to the AC line through an active N-Level bleeder facility 114. The system may introduce an N-level bleeder by automatically selecting an appropriate dummy resistance load at different dimming current levels so that the holding current of the TRIAC can be maintained when the light source is interfacing with a leading edge dimmer. The multiple N-levels of the dummy resistance load may be implemented to overcome the LED flickering in both leading edge and trailing edge dimmers and minimizing the power loss from the bleeder. This may result in different output current levels according to the conduction angle cutoff from the dimmer having different levels of the bleeder (e.g. a high current level has a weaker bleeder, a low current level has a stronger bleeder). The levels of the dummy resistance load may be determined by direct or indirect signals (e.g. output current, output voltage) that indicate the dimming level of the LEDs. The system may introduce a dimmer type detection facility 118 as an auto-selector to switch the dummy resistance loads to the AC line to be more accurately based on the type of dimmer being used in the dimming device 102, and the output current level. Advantages may include reduced LED flickering in the dimming range, minimized power loss, widened dimming range (e.g. 0-100% dimming), greater compatibility with different dimmer circuit types, and the like.

Figure 6:
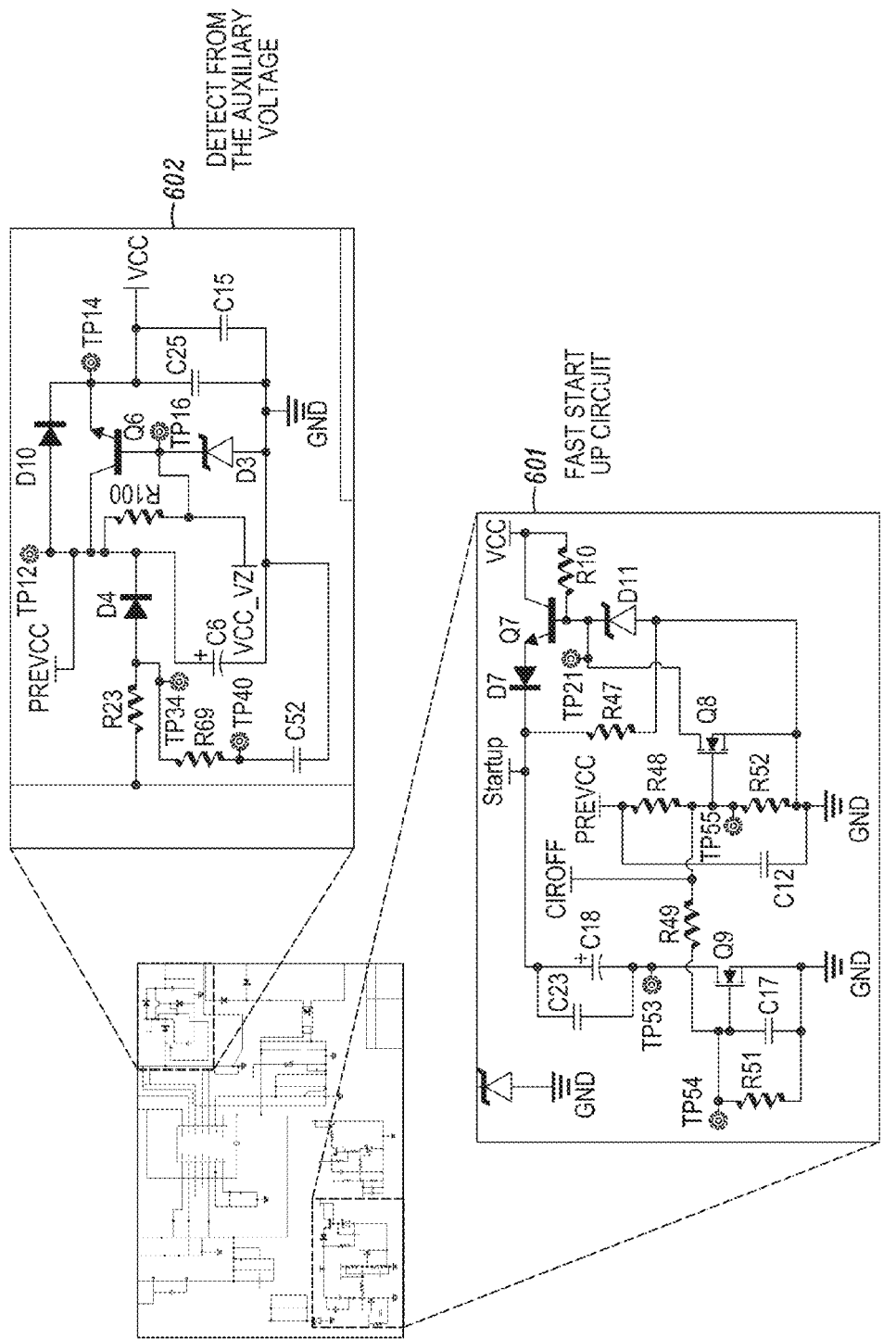
FIG. 6 depicts a circuit for voltage detection and for a fast start up circuit in an embodiment of the present invention.

Referring to FIG. 6, an example circuit embodiment is presented showing a detection circuit for auxiliary voltage 602 and for fast start up 601 as part of the fast startup override facility 110. The system may use a linear regulator supplied by the IC Vcc to pull high the pulse-width limit (PWMLIMIT) pins, which is used to control the driving duty of converter (e.g., the higher the voltage on the PWMLIMIT, the larger the duty cycle the converter has), and the auxiliary voltage to switch off the regulator to allow the PWMLIMIT driven by the averaging RC network to operate normally. As the auxiliary voltage is proportional to the voltage on the LED module, the system may ensure the driver operating with higher than normal duty cycle at the corresponding level of output current to rise up the output voltage to certain level, and then removing it to allow the converter to operate with a normal duty according to the average voltage of the RC network once the output voltage risen up to a certain level. Unit start-up with a higher than normal duty may allow the converter to deliver higher than normal dimming power or normal power to output with faster start up. Once the output voltage rises up to the certain level, the system removes the higher than normal command.

Figure 7:
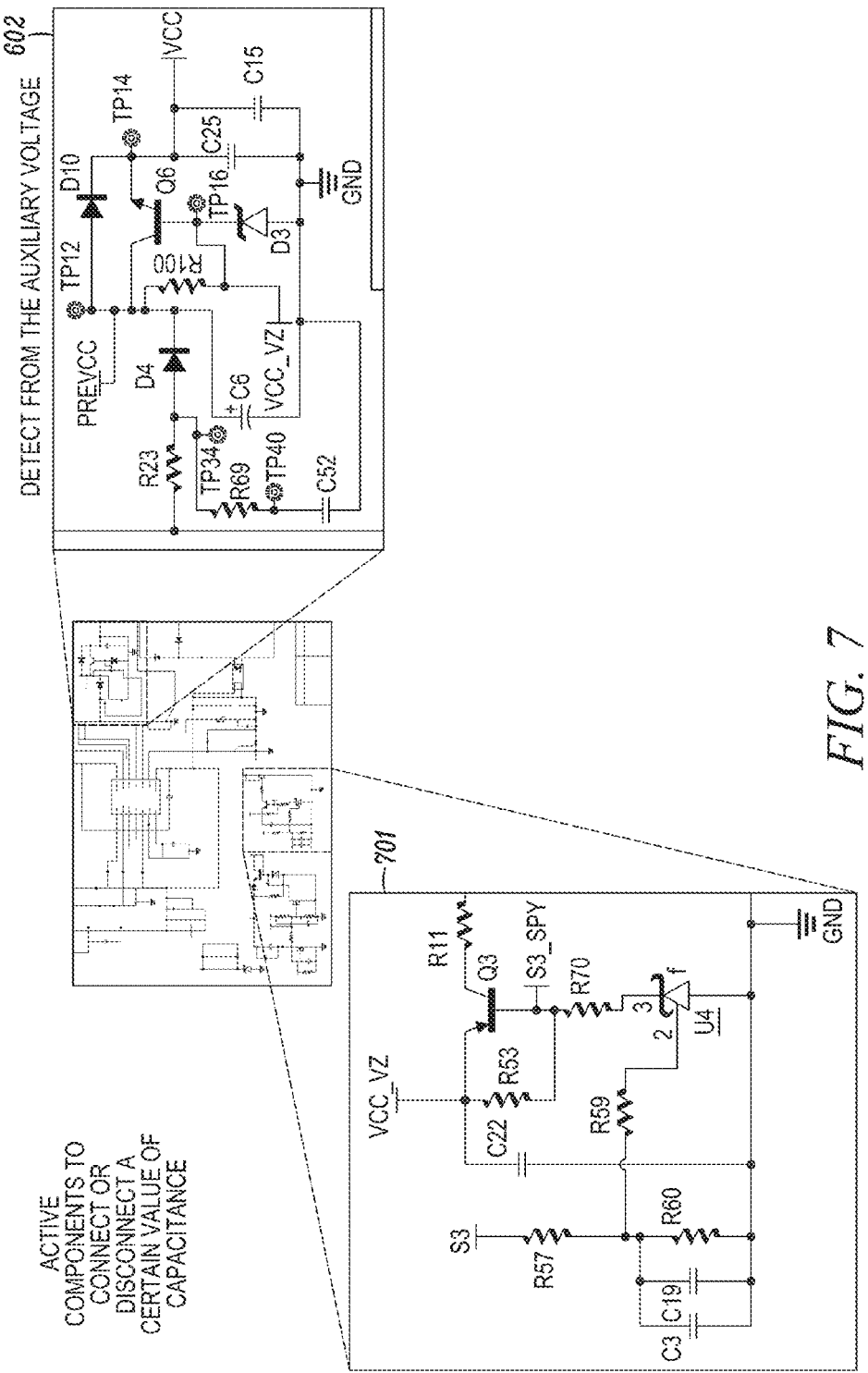
FIG. 7 depicts a circuit for a dynamic capacitance in an embodiment of the present invention.

Referring to FIG. 7, an example circuit embodiment is presented where fast LED start-up at low dimming conditions may also be implemented by speeding up the charging of the RC network through the dynamic RC selection facility 112. In embodiments, a dynamic capacitor circuit 701 may be added to allow the RC network to have a varying response at different conditions. During the startup, the connection is removed to provide a smaller capacitance capacitor to speed up the charging of RC network. Once the output voltage rises up to a certain level, a larger capacitance capacitor is reconnected, such as by active components. To improve the dimming response, the system may also vary the capacitance by connecting and disconnecting a capacitor connection to maintain the dimming performance. Different capacitance may be used to improve the transient of the RC network at different dimming conditions.

Figure 8:
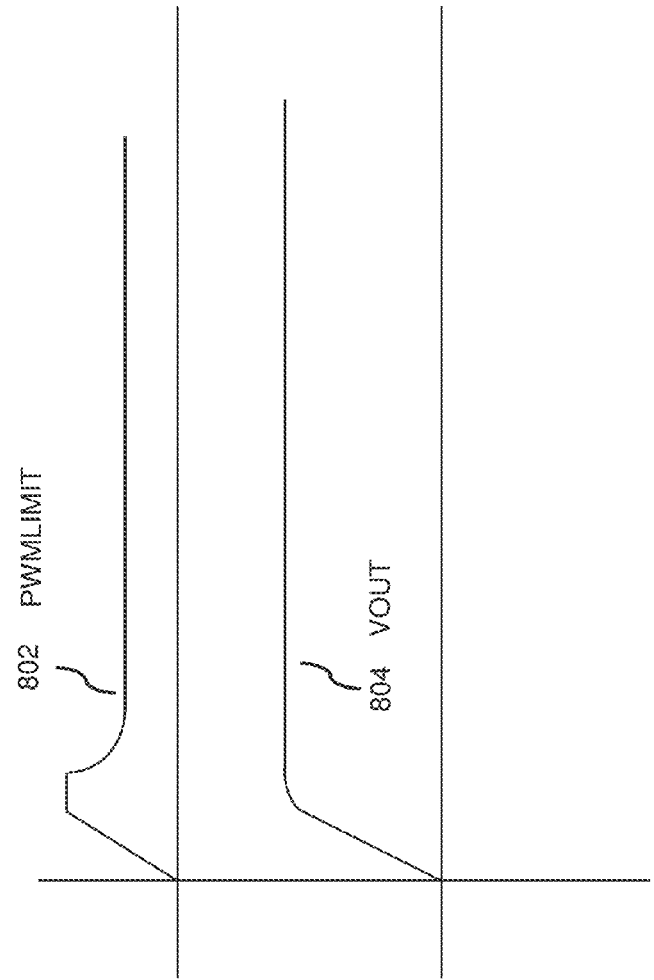
FIG. 8 depicts a waveform illustrating a fast start up at low dimming condition.

FIG. 8 depicts a waveform showing the fast LED start up at low dimming conditions, where the PWMLIMIT pin waveform 802 shows a change in voltage during start up, and where $V_{OUT}$ 804 is shown to be linear after turn on.

Figure 9:
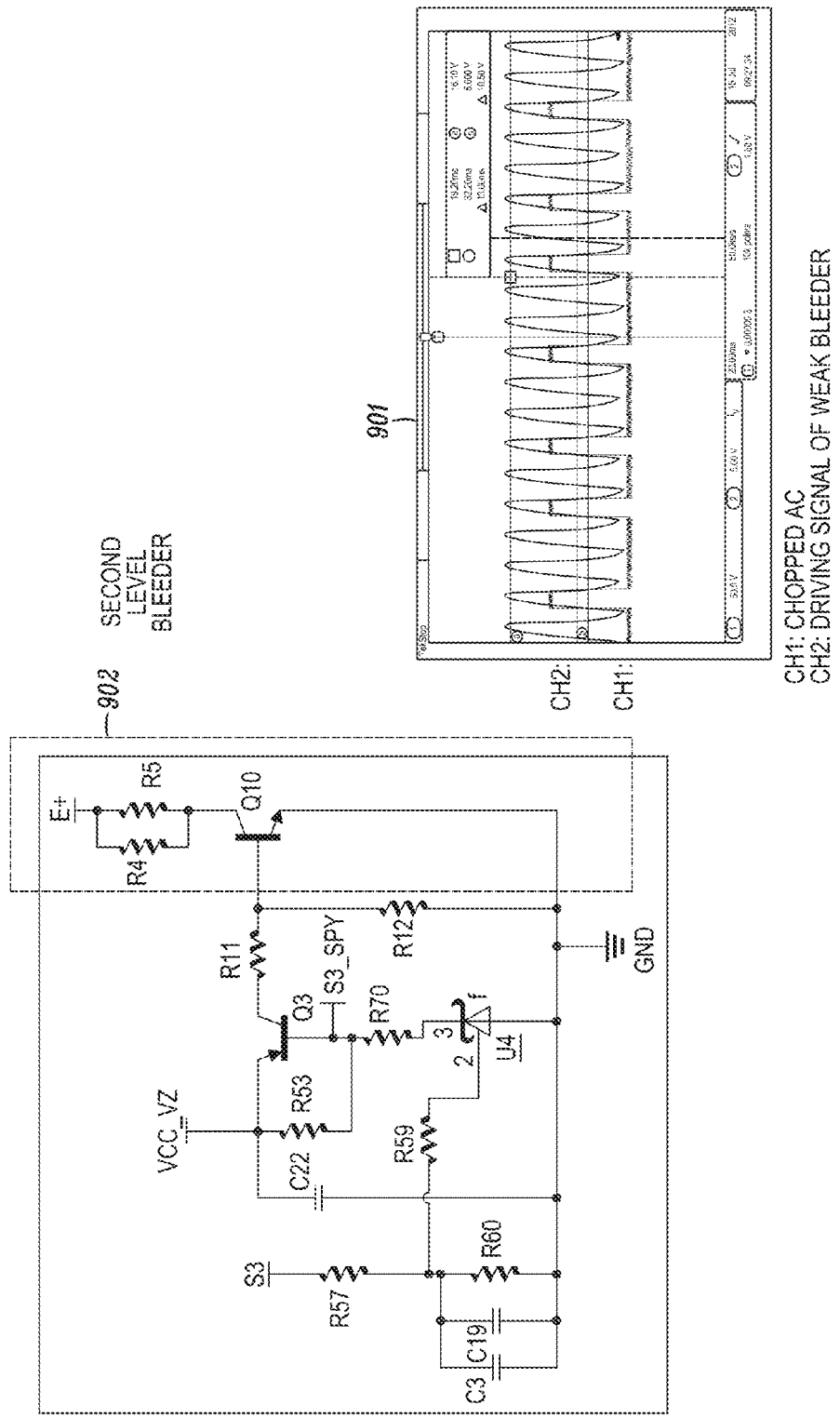
FIG. 9 depicts a waveform and circuit for an n-level bleeder in an embodiment of the present invention.

In embodiments, the active N-level bleeder facility 114 may improve dimming performance, especially in the case where a small resistance resistor is used to maintain the holding current of the TRIAC in a leading edge dimmer at low output current condition, where the bleeder may be switched on and off unevenly as shown in the waveform 901 shown in FIG. 9. This may affect the power delivery to the output under the same power level cycle of conduction angle, thus leading to flickering. To solve this problem, the system may use a large resistance resistor rather than smaller one, and introduce a second level bleeder 902 as shown in the circuit shown in FIG. 9, which detects a driving cycle of a strong bleeder to determine the dimming level. Once the predesigned level is reached, the second level bleeder is switched on. Therefore, the converter has a different level of bleeder for different dimming conditions, where the flickering problem due to the bleeder switching on and off unevenly can be minimized as a larger resistance resistor is used and the holding current required for the TRIAC operation at low output current conditions can be maintained without flickering.

Figure 10:
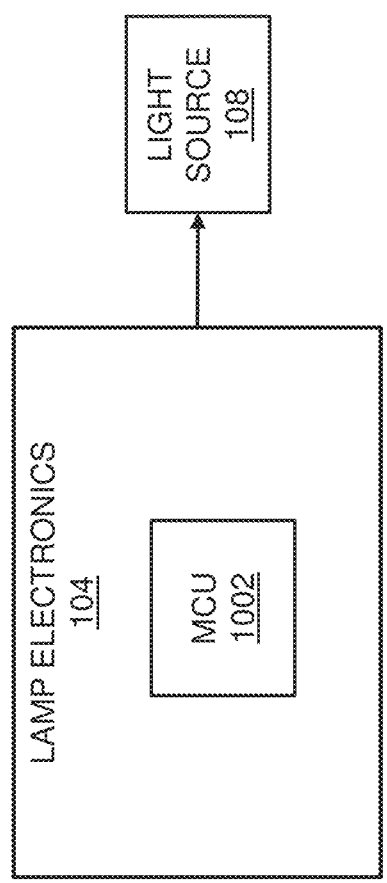
FIG. 10 depicts a block diagram illustrating a microcontroller implementation of embodiments of the present invention.

Referring to FIG. 10, in embodiments the implementations disclosed herein may be realized in analog and/or digital circuits, including through the utilization of microcontroller unit (MCU) 1002 and the like, as part of the lamp electronics 104. For example, the system may detect a signal from the auxiliary voltage to indicate whether the auxiliary voltage is raised up to a normal voltage level. When the LED driver is switched on, the auxiliary voltage may still not be raising up to a certain level. The MCU may then deliver a higher than normal duty cycle to the driver in order to generate a faster LED startup response. After the auxiliary voltage is raised to a normal level, the MCU may detect a voltage in the phase angle detection circuit (e.g. an average voltage from the RC network) by an analog to digital converter (ADC). Then, the digital value from the ADC may be matched to an appropriated value by a linearity-mapping algorithm. Finally, a pulse-width modulated signal may be delivered to the driver and the duty cycle determined by the output of the linearity-mapping algorithm. An RC filter may be added in order to get the average voltage of the pulse-width modulated signal. A microcontroller may also be used to detect whether a leading edge dimmer or a trailing edge dimmer is connected to the LED light by detecting the phase cut characteristic in the AC line voltage, such as through zero crossing detection and detection of the voltage after the zero crossing point. Improvement in the compatibility of different types of dimmers may be made through switching different dummy resistance loads, or even disconnecting the dummy resistance load to fulfill the requirements of the different dimming circuit types.

Figure 11:
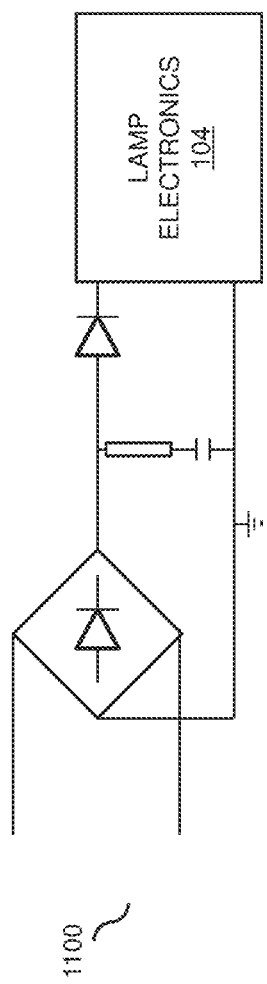
FIG. 11 depicts a block diagram for power correction in dimming as representative of the prior art.

In embodiments, the lamp 100 may improve power correction during dimming through adjustment of the circuit due to detection of different dimmer circuit types, such as detecting the difference between rising and falling edge TRIAC dimming circuits, where if a leading edge dimmer is detected an RC circuit is connected and otherwise disconnecting the RC circuit (including if a trailing edge dimmer is detected). Characteristics in using traditional leading edge dimmers to dim LEDs include a need for a holding current so the TRAIC in leading edge dimmer can be conducted continuously. But the driving current for LEDs is too small to achieve the holding current. Generally, an RC circuit with diode network is required after the rectifier to overcome this problem, such as the circuit 1100 shown in FIG. 11. However, the reactive power required by the capacitor in the RC circuit increases the apparent power. As a result, the input voltage and the input current are running with phase shift with certain degrees even when there is no dimmer connected. Also, the RC circuit will cause LED flickering when a trailing edge dimmer is used because the capacitor in the RC circuit could not be discharged completely during the off cycle leading reverse bias of the rectifier diode. Though a non-flickering condition could be obtained by capacitance reduction for a trailing edge dimmer, the leading edge dimmer may not have enough to maintain the holding current for its TRAIC to turn on. This leads to poor compatibility between a leading edge dimmer and a trailing edge dimmer.

In embodiments, the lamp 100 may solve this problem through a dimmer type detection facility 118, which detects which dimmer is being used. For instance, if a leading edge dimmer is connected, then the RC circuit will be connected. If a trailing edge dimmer is connected, or there is no dimmer connected at all, then the RC circuit will be disconnected. As a result, the reactive power will be reduced and cause the apparent power to be closer to the real power when there is no dimmer. There is also then no LED flickering when trailing edge dimmer or leading edge dimmer is used, where the system is compatible with leading edge dimmers and trailing edge dimmers with less power loss in reactive power, and compatible with standard dimmable LED drivers.

Figure 12:
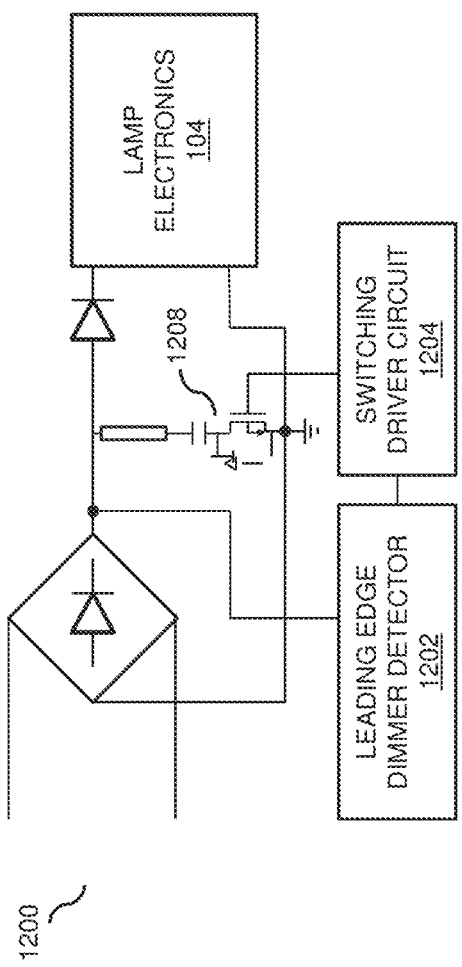
FIG. 12 depicts a block diagram for detection of a leading edge dimmer in an embodiment of the present invention.

Referring to the circuit 1200 in FIG. 12, a rectified signal is used by a leading edge dimmer detector 1202 to distinguish whether there is a leading edge dimmer is connected. If so, a pulse signal will be sent to a switching driver circuit 1204 causing a switching device 1208 to connect or disconnect the RC circuit appropriately at different conditions. For example, a MOSFET may be used and where its body diode can be utilized for discharging the capacitor when it is turned off.

Figure 13:
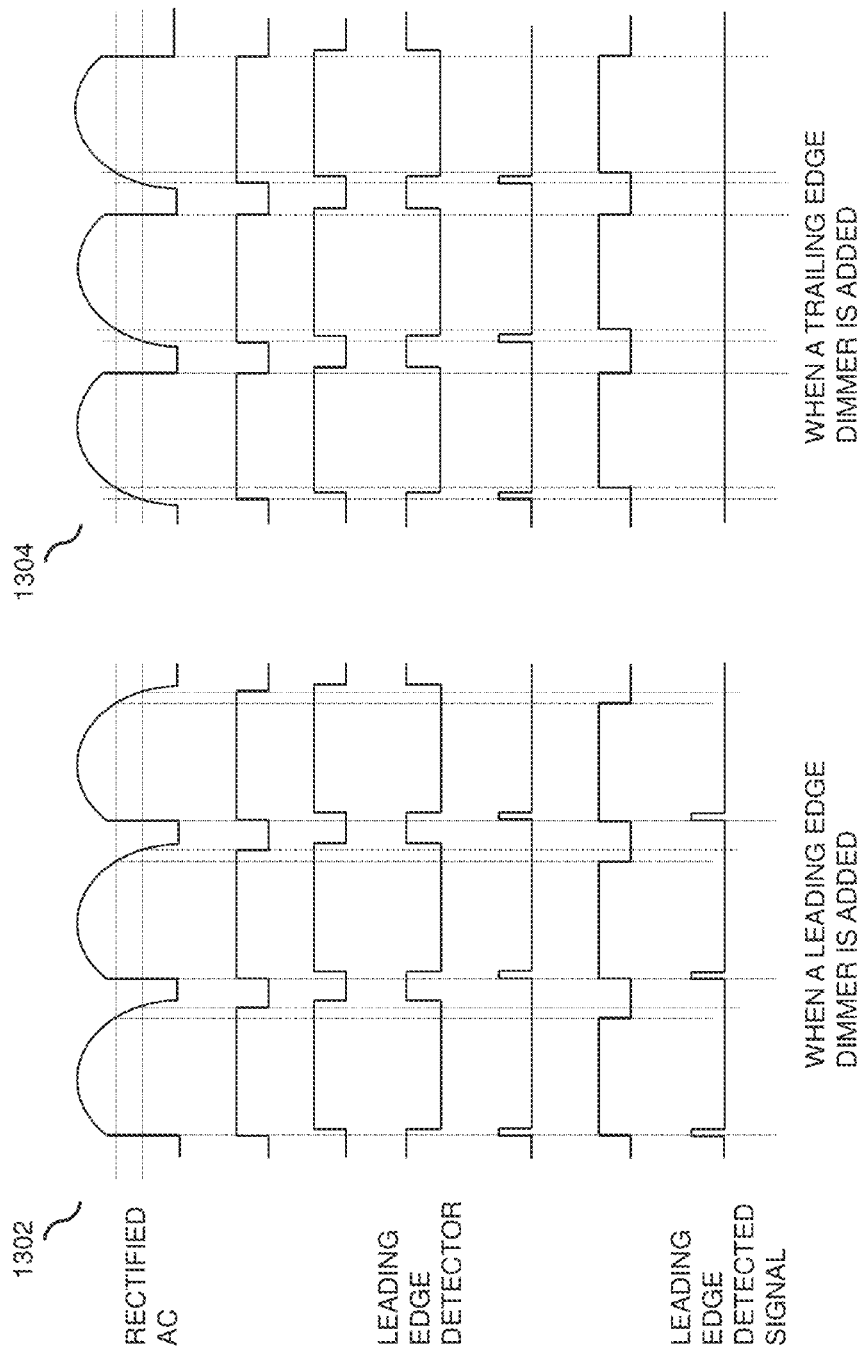
FIG. 13 depicts a waveform set for a leading edge detector in an embodiment of the present invention for when a leading edge dimmer is added and when a trailing edge dimmer is added.
Figure 14:
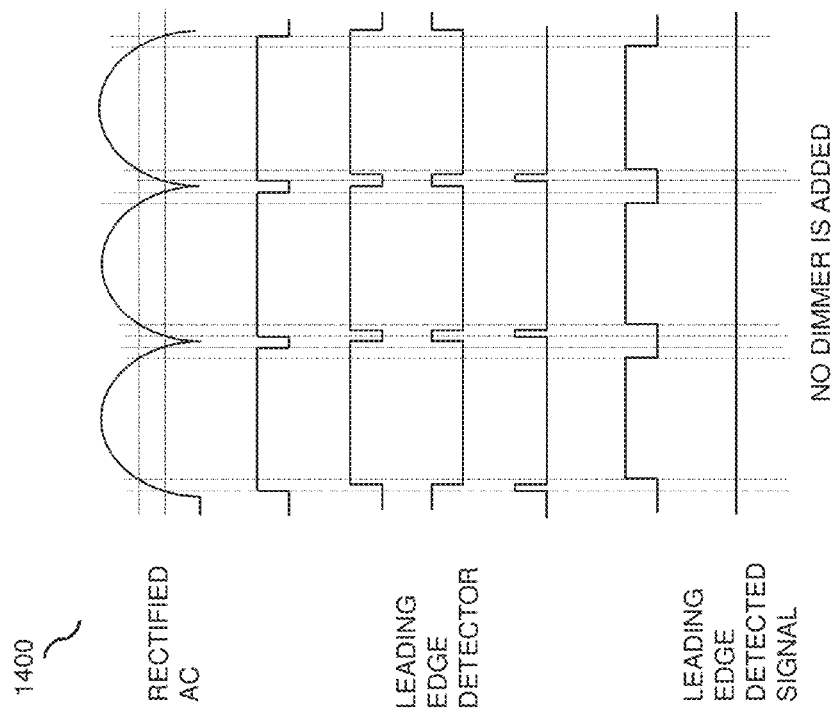
FIG. 14 depicts a waveform set for a leading edge detector in an embodiment of the present invention for when no dimmer is added.
Figure 15:
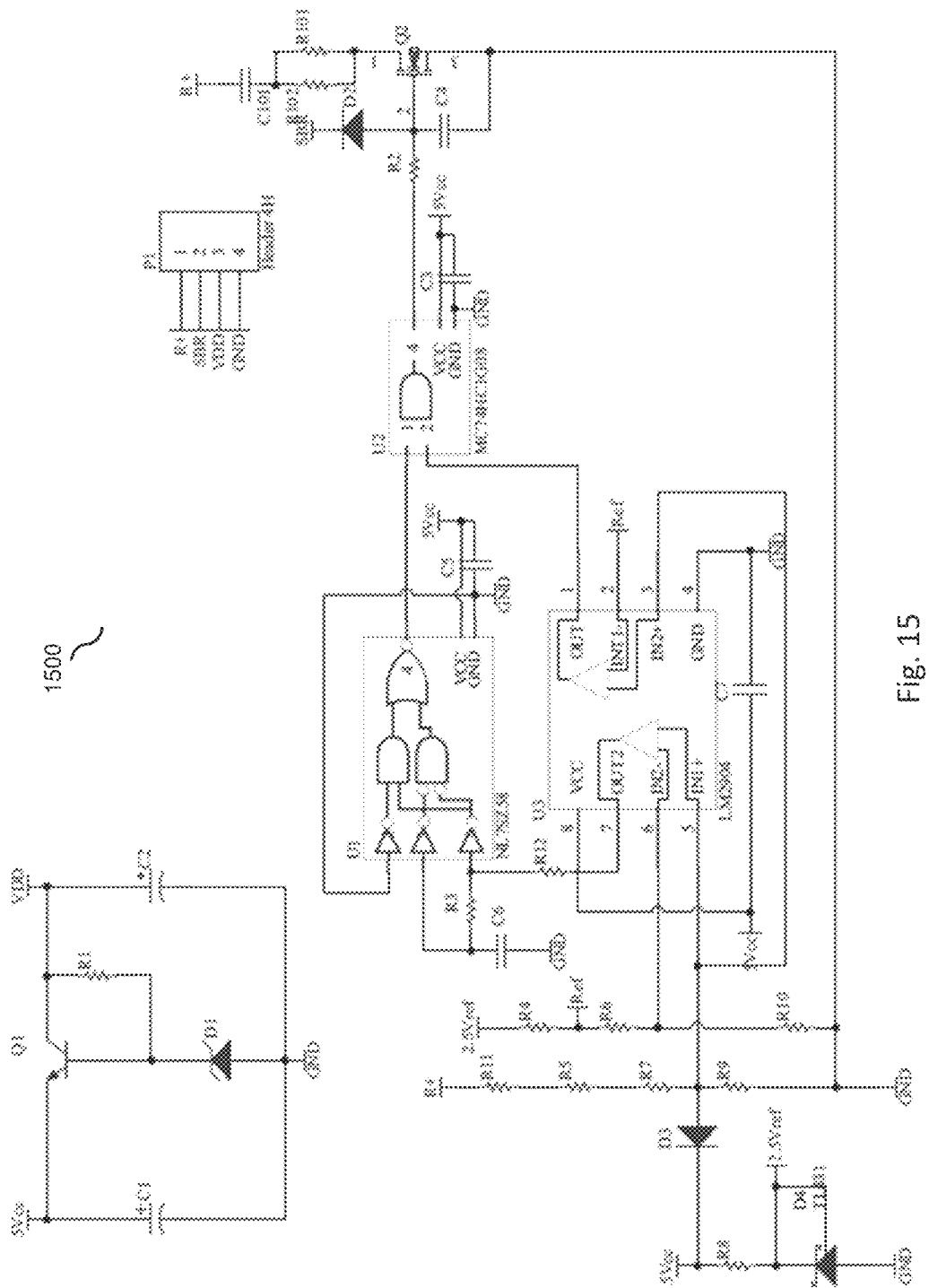
FIG. 15 depicts a dimming type detection circuit in an embodiment of the present invention.

FIGS. 13-14 depict the signals associated with the detection of a leading edge dimmer 1302, trailing edge dimmer 1304, and no dimmer 1400. FIG. 15 provides an embodiment schematic diagram 1500 in an implementation of the dimming type detection circuits.

In embodiments, the system may provide a symmetrical phase dimming facility 122 to improve linearity with respect to the human eye's response to light. For instance, in a standard A.C. dimming device 102, a signal is provided to a lamp that produces a non-linear lighting response with respect to the dimmer's control position. That is, as a person gradually adjusts the dimmer down from 100% brightness, the signal being provided to the light source produces a decreasing light intensity that is slow and non-linear at first, and then gradually becomes more linear. This is due to the sinusoidal nature of the A.C. input signal and the asymmetrical manner in which the A.C. input signal is being cut by the dimming circuit. This effect is most pronounced in the dimming range between 100% and 70% dimming, where the dimming phase cut trigger is near the peak of the sinusoidal input signal. The following equation shows helps illustrate this relationship:

$$Vin(\theta) = Vin_{rms} \sin \theta$$

For simplicity, if we assume $Vin_{rms}=1$, when performing dimming, $Vin(\theta)$ is equal to the phase angle from zero to $\alpha$, and the voltage signal for the controller dimming control by an averaging method would be equal to:

$$Vinmean(\alpha) = \frac{\int_\alpha^\pi Vin(\theta)d\theta}{\pi}$$

Figure 16:
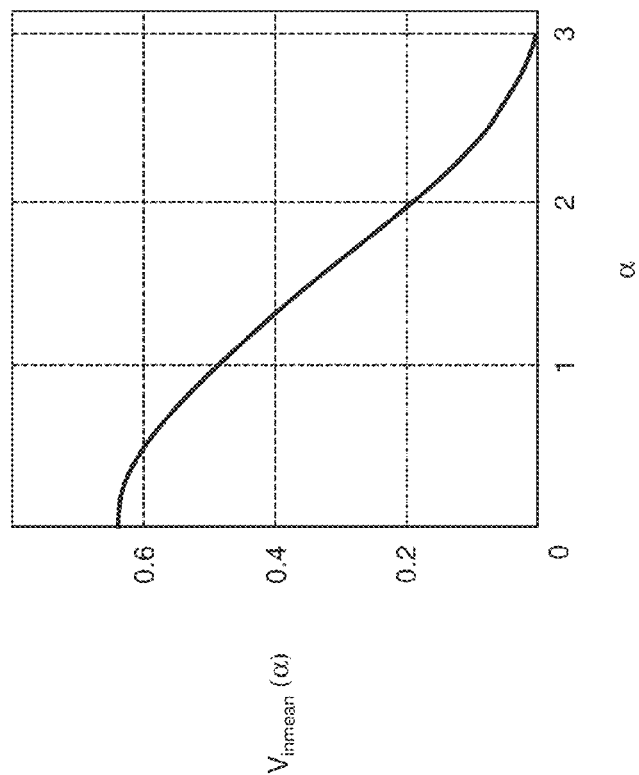
FIG. 16 depicts a plot of the mean input voltage to a controller as found in the prior art.

Note that with the symmetry of the sine wave, the leading and trailing edge dimmers provide the same performance. If Vinmean($\alpha$) were to be plotted against $\alpha$, it would be found that the signal for the controller dimming is not linear, as the plot 1600 shown in FIG. 16. Which is the reason why the luminous output does not change significantly during the initial dimming portion.

Figure 17:
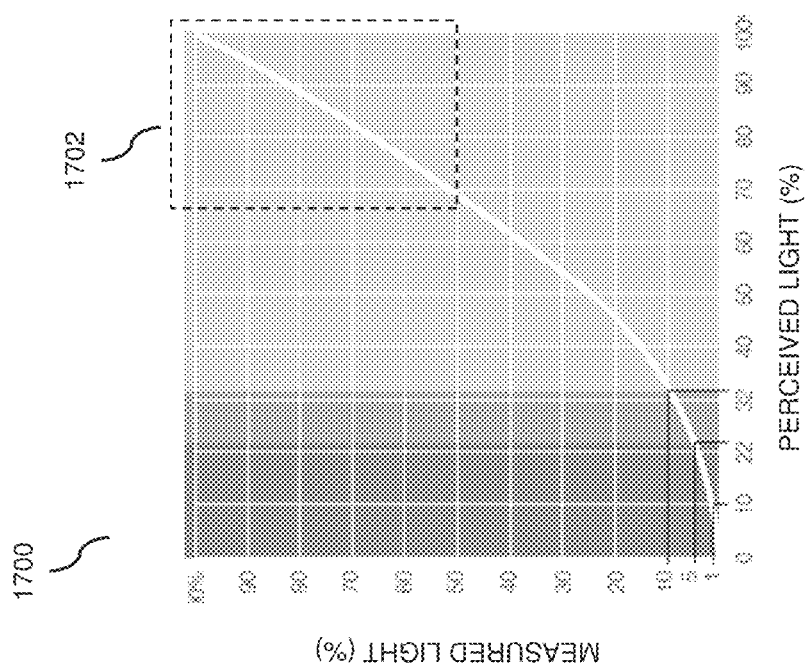
FIG. 17 depicts a plot of the human eye's response to light level.

Referring to the plot 1700 in FIG. 17, which depicts the human's eye response to light, it can be seen that the eye responds in a nearly linear fashion to light levels in the upper brightness portion 1702 of the response curve, such as between 70% and 100%. By comparison, with Vinmean($\alpha$), this same range is quite different, thus providing a poor match to the expectation of a person using a dimming device. Therefore there is a need to more closely match the human eye's response by improving the linearity match during dimming, especially for a controller using a voltage averaging method.

Figure 18:
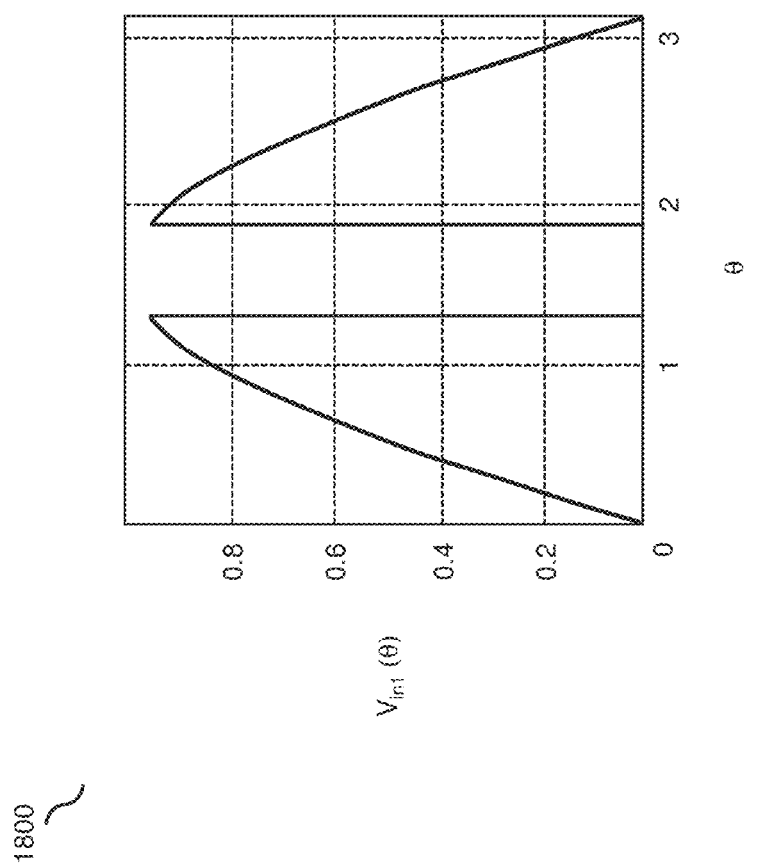
FIG. 18 depicts a plot of an embodiment phase cut method.

Referring to the plot 1800 in FIG. 18, an embodiment phase cut method for dimming is depicted, where the method would start to cut the conduction at 90 degrees of the sine wave, and then expand symmetrically up and down from the 90-degree starting point. This is as opposed to a traditional rising or trailing edge technique, where the progressively increasing cut is made in an asymmetric manner. Averaging this signal can be represented by the following equation:

$$Vinmean1(\alpha) = \frac{\int_0^{\frac{\pi}{2}-\frac{\alpha}{2}} Vin(\theta)d\theta + \int_{\frac{\pi}{2}+\frac{\alpha}{2}}^\pi Vin(\theta)d\theta}{\pi}$$

Figure 19:
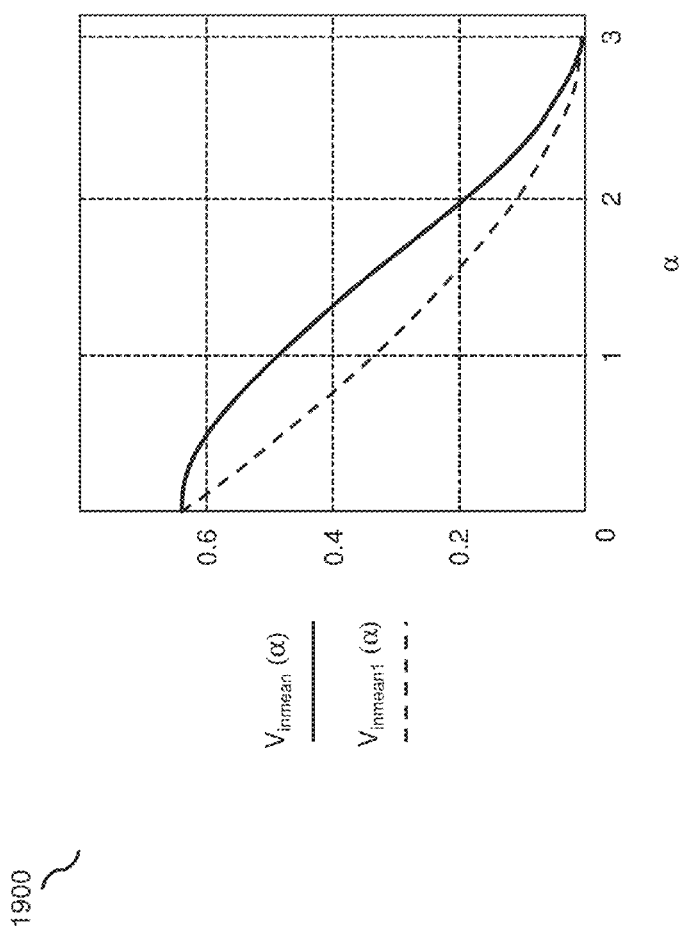
FIG. 19 depicts a comparison of the prior art mean input voltage with an embodiment mean input voltage from the phase cut method.

Referring to the plot 1900 in FIG. 19, a comparison is shown between a plot of Vinmean($\alpha$) against $\alpha$, and Vinmean1($\alpha$) against $\alpha$, which shows that Vinmean1($\alpha$) is significantly more linear than Vinmean($\alpha$).

Figure 20:
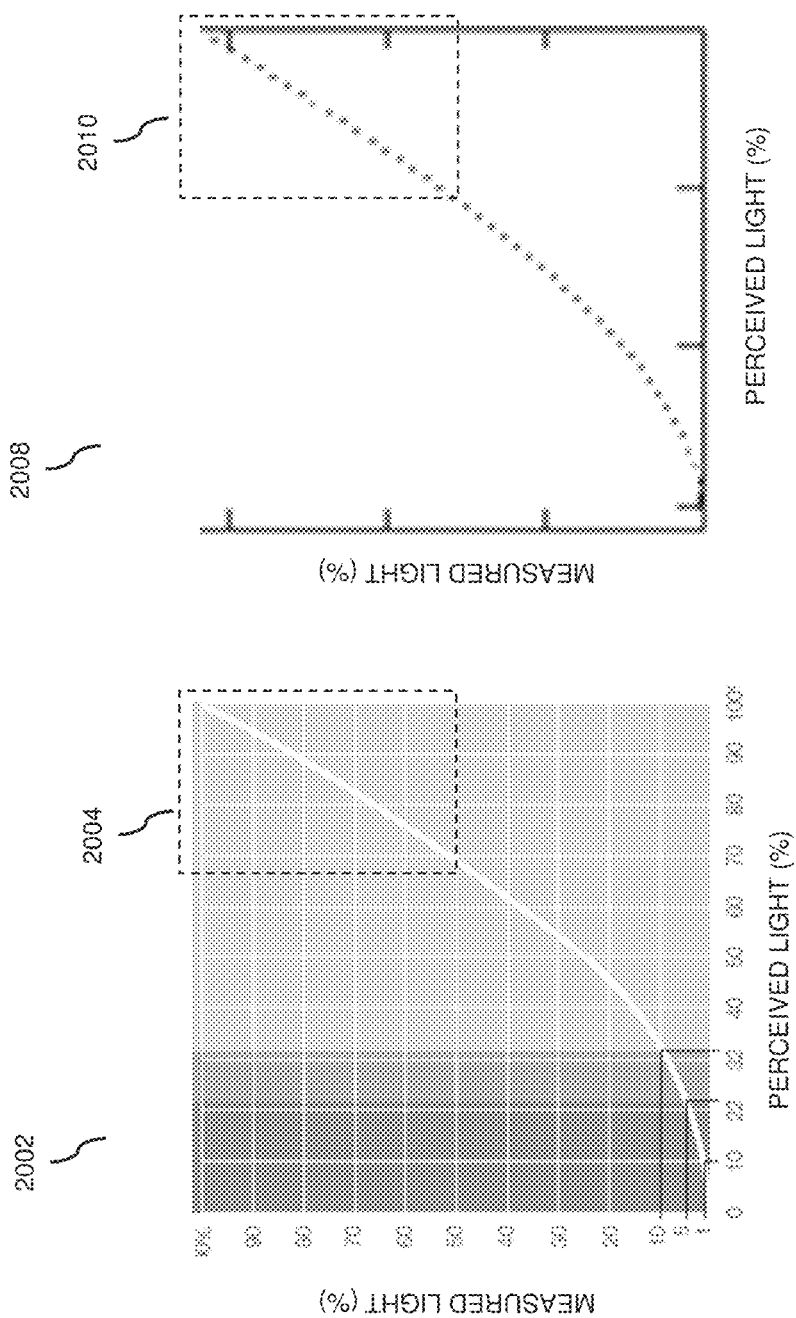
FIG. 20 depicts a comparison of a standard human eye's response to light level with the human eye's response to an embodiment phase cut method.

Referring to FIG. 20, a comparison is shown of the human eye's response to light 2002, and a dimming performance curve 2008 using the embodiment phase cut method, where the upper portions of the plots 2004 and 2010, representing the approximately 70% to 100% dimming portion, are a very good match to one another. The realization of the dimming performance curve 2008 is achieved by symmetrically cutting the A.C. signal to the lighting source.

Figure 21:
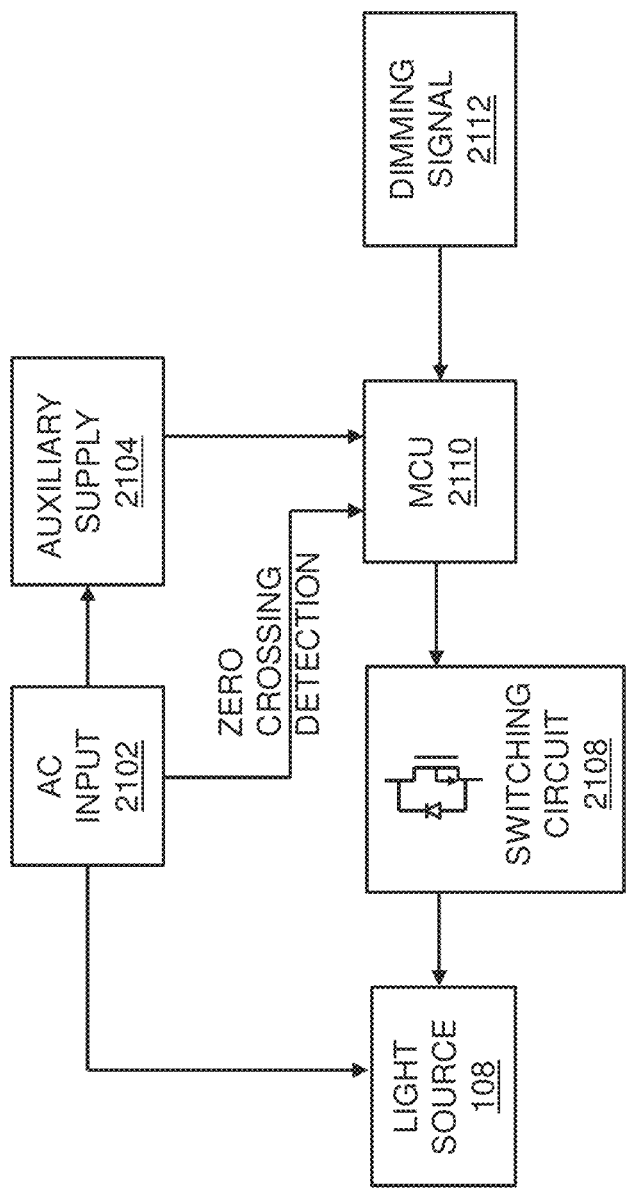
FIG. 21 depicts an embodiment block diagram of a phase cut method using analog circuits and a microcontroller unit.

In embodiments, FIG. 21 shows a top level block diagram of the symmetrical phase dimming facility 122, including an AC input 2102, an auxiliary supply 2104, a dimming signal 2112, a microcontroller unit (MCU) 2110, and a switching circuit 2108, which provides dimming control to a lighting source 108 (e.g. incandescent, LED, and the like). In embodiments, the dimming signal may be wired or wireless signal as a 0-10V Lighting Control input, a Digital Addressable Lighting Interface (DALI), a variable resistor, or the like. In this embodiment, the auxiliary supply provides power to the MCU and a dimming signal module receiving the dimming signal, where the auxiliary supply may be an AC/DC, DC/DC switch topology or even batteries to provide power for the MCU and the dimming signal module. The MCU then detects the zero crossing from the A.C. input and transfers the input data to a corresponding PWM signal (e.g. without mapping) to drive the switching circuit (e.g. MOSFET switches) to produce the dimming control of the light source.

Figure 22B:
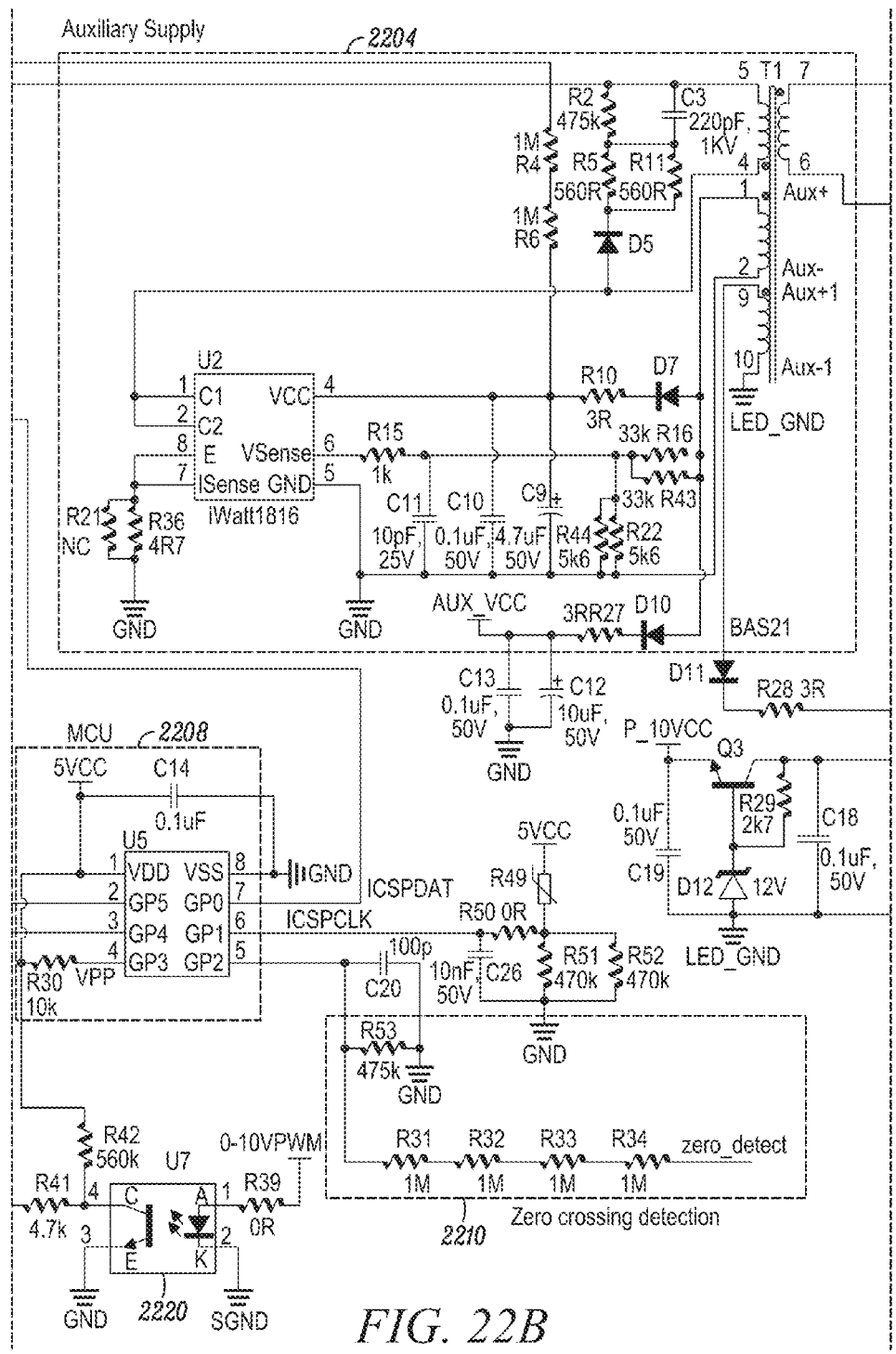
Figure 22C:
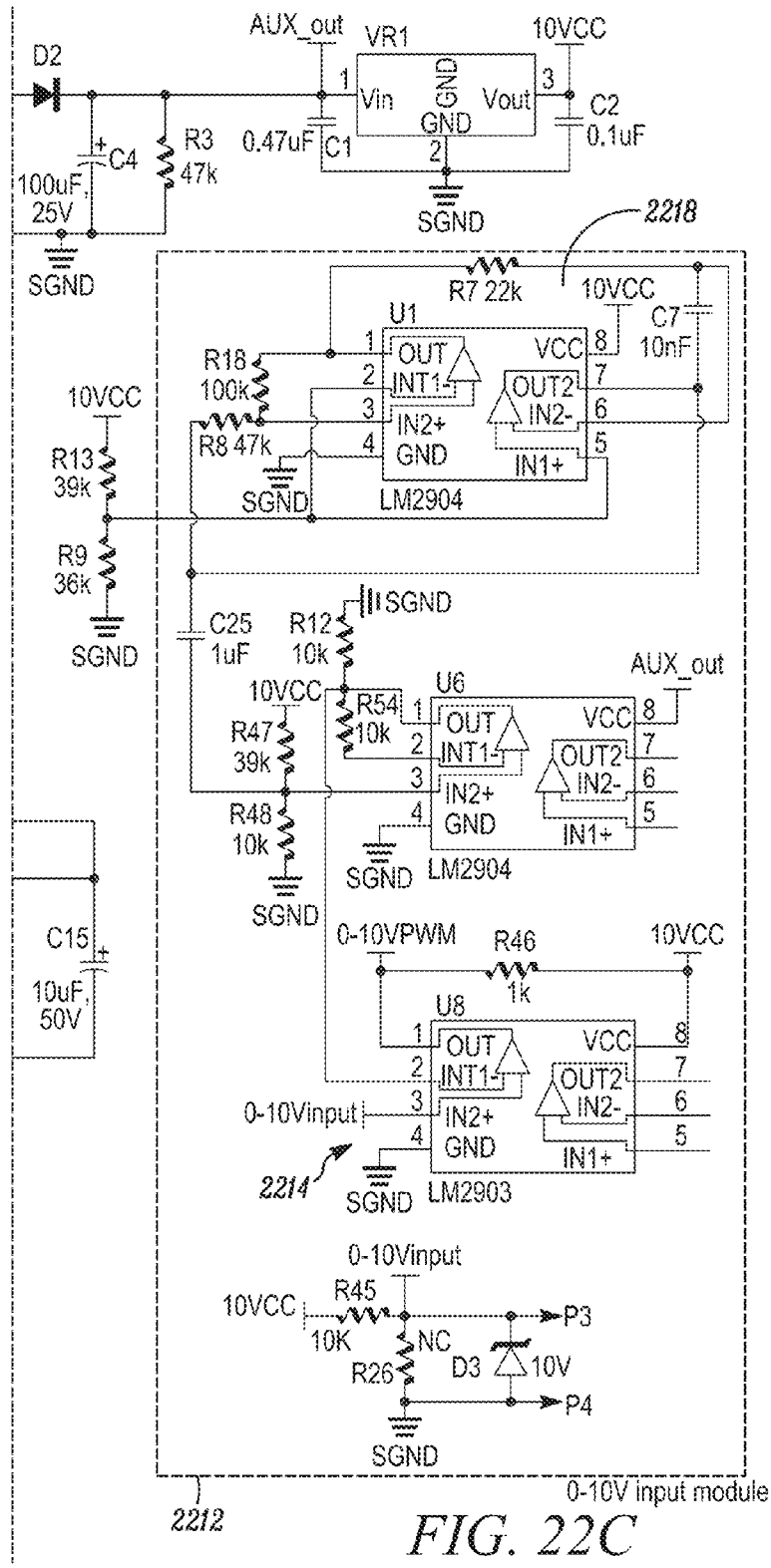

In embodiments, FIGS. 22A, 22B and 22C depict a detailed implementation of the symmetrical phase dimming facility 122. Note that FIGS. 22A, 22B and 22C are meant to be illustrative of a possible implementation, and are not meant to be limiting in any way. As shown, the schematic in FIG. 22A depicts an A.C. input 2202 and a switching circuit 2211. FIG. 22B depicts an auxiliary supply 2204 (providing power to the MCU and the 0-10V input module), an MCU 2208 and a zero crossing detector 2210. FIG. 22C depicts a 0-10V input module 2212. The 0-10V input signal is input to a comparator 2214 to compare with a triangular wave that is generated by two op-amps 2218. The output signal form the 0-10V input module is isolated by an optocoupler 2220 and then averaged to be inputted to an analog-to-digital converter (ADC) of the MCU. The zero-crossing detector provides a zero-crossing signal to the MCU from the A.C. input. According to the zero-crossing detection, the MCU generates a pair of pulse-width modulated (PWM) signals, where the two PWM signals are generated to the drive the two MOSFETs of the switching circuit 2211 alternatively depending on the polarity of the A.C. line. The two MOSFETs will be driven on and off to cut the phase of the AC line. In embodiments, the phase cut AC line may be utilized with any phase cut dimming lighting device, such as incandescent and phase cut dimmable LEDs.

Figure 23:
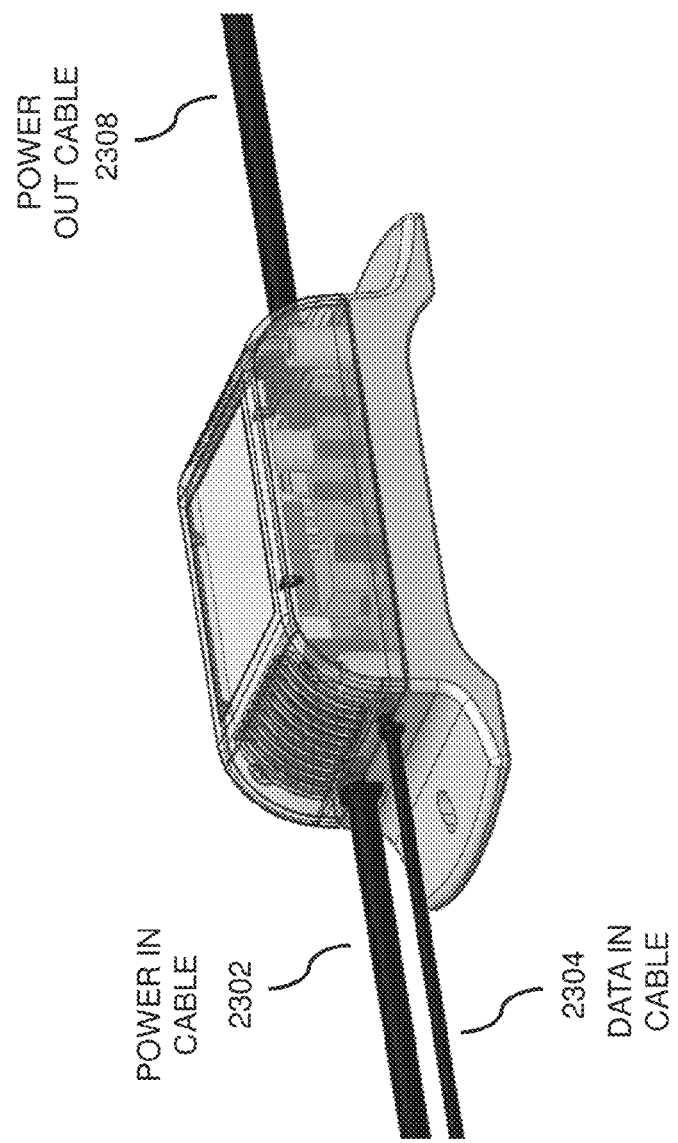
FIG. 23 depicts an annotated physical configuration in an embodiment of the phase cut method.

In embodiments, the symmetrical phase dimming facility 122 may be utilized with any light source, and so may be integrated into the lamp 100 or be a stand-alone device. FIG. 23 depicts an embodiment implementation where the symmetrical phase dimming facility 122 is a stand-alone device, showing power in 2302, data in 2304, and power out 2308 as the interface connections.

Figure 24:
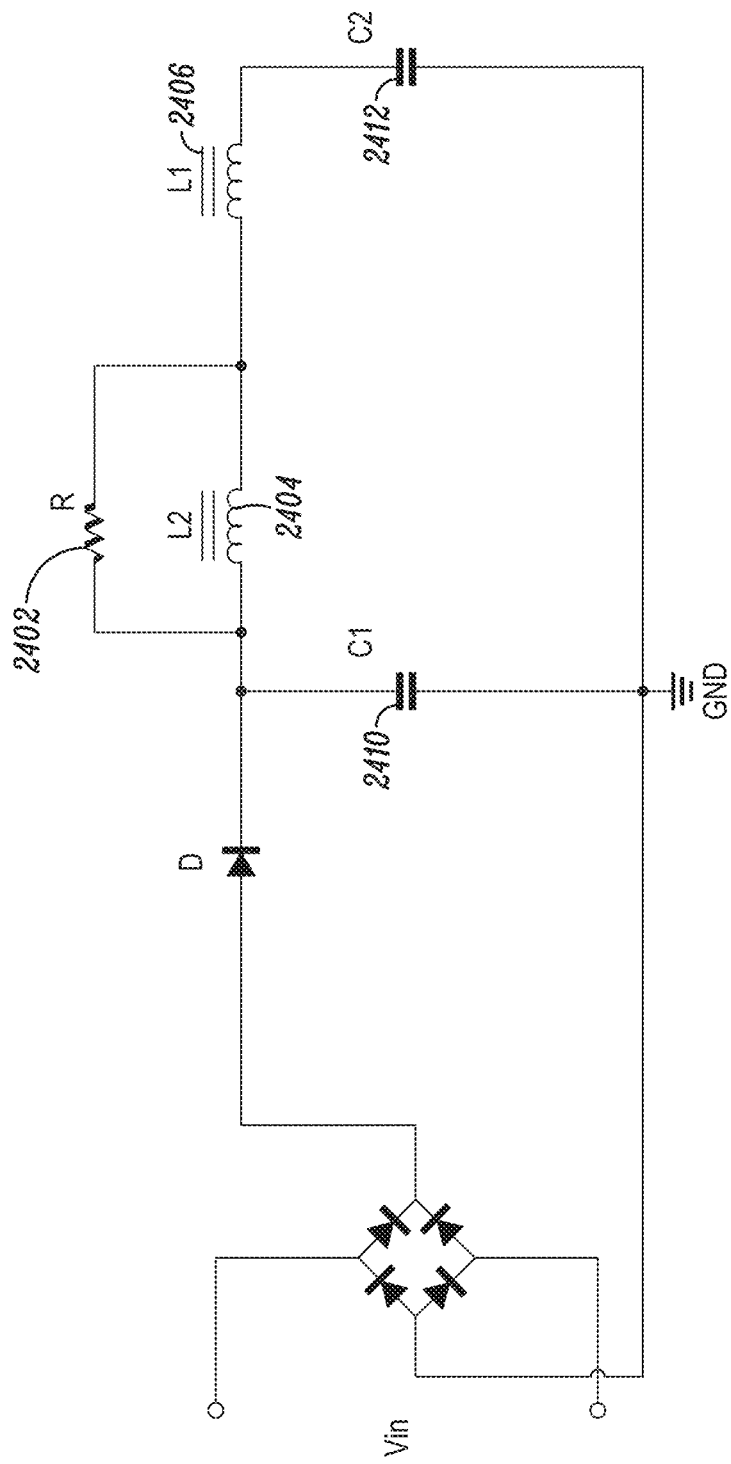
FIG. 24 depicts a circuit embodiment for reducing flicker in a lamp.
Figure 25A:
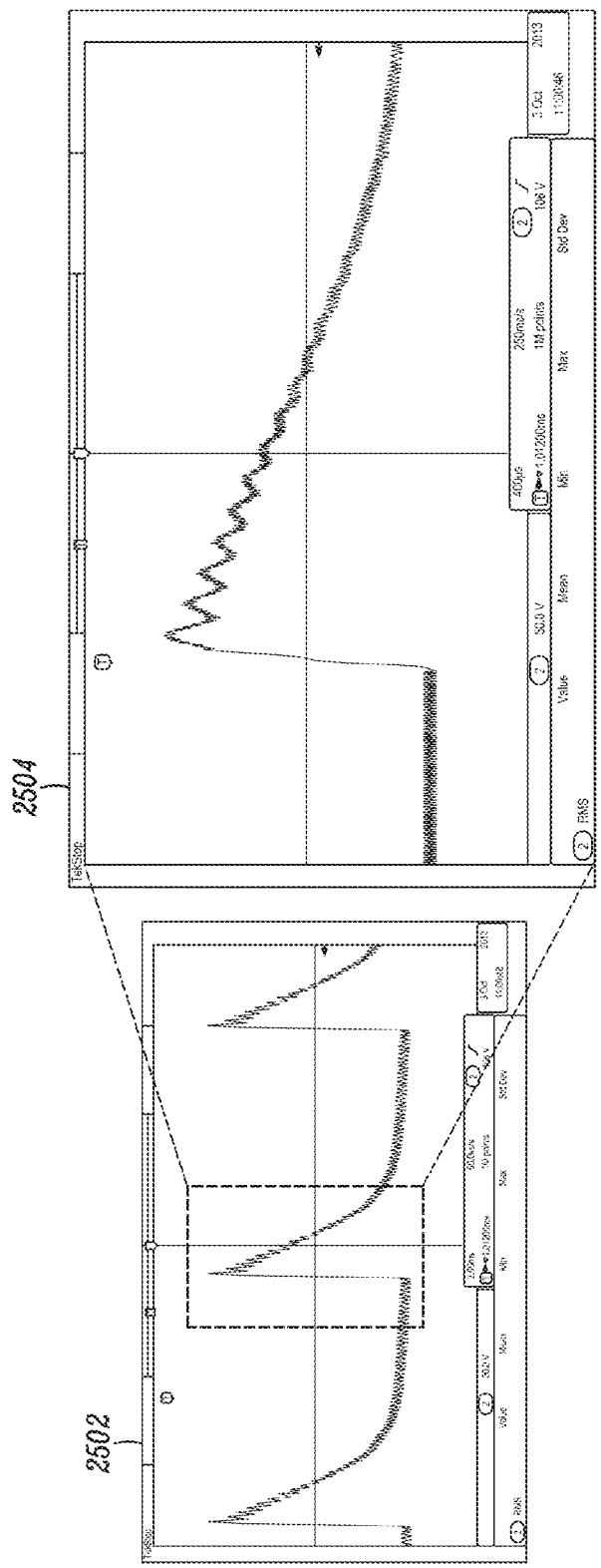
FIG. 25A is a waveform that may cause flicker in a lamp.

In embodiments, a flicker reduction facility 124 may be utilized to help reduce the potential for lamp flicker in conjunction with circuit components for reducing EMI. Referring to FIG. 24, ignoring the presence of R 2402 and L2 2404 for the moment, a differential mode filter inductor L1 2406 may be used to help meet EMI requirements for a LED lamp. Although the differential mode filter inductor L1 2406 may reduce EMI when a larger inductance is used, it will also increase the possibility of producing flickering in the LED lamp because of the LC resonance at L1 2406 and C2 2412. FIG. 25A shows a waveform at a certain dimming level across C2 when L1 is 3.68 mH. It has been found in experimentation that this noisy waveform usually causes flickering at low dimming levels, especially when a leading-edge dimmer is used. Thus, the circuit with L1 (without R and L2) may reduce EMI, but may also increase flicker.

Figure 25B:
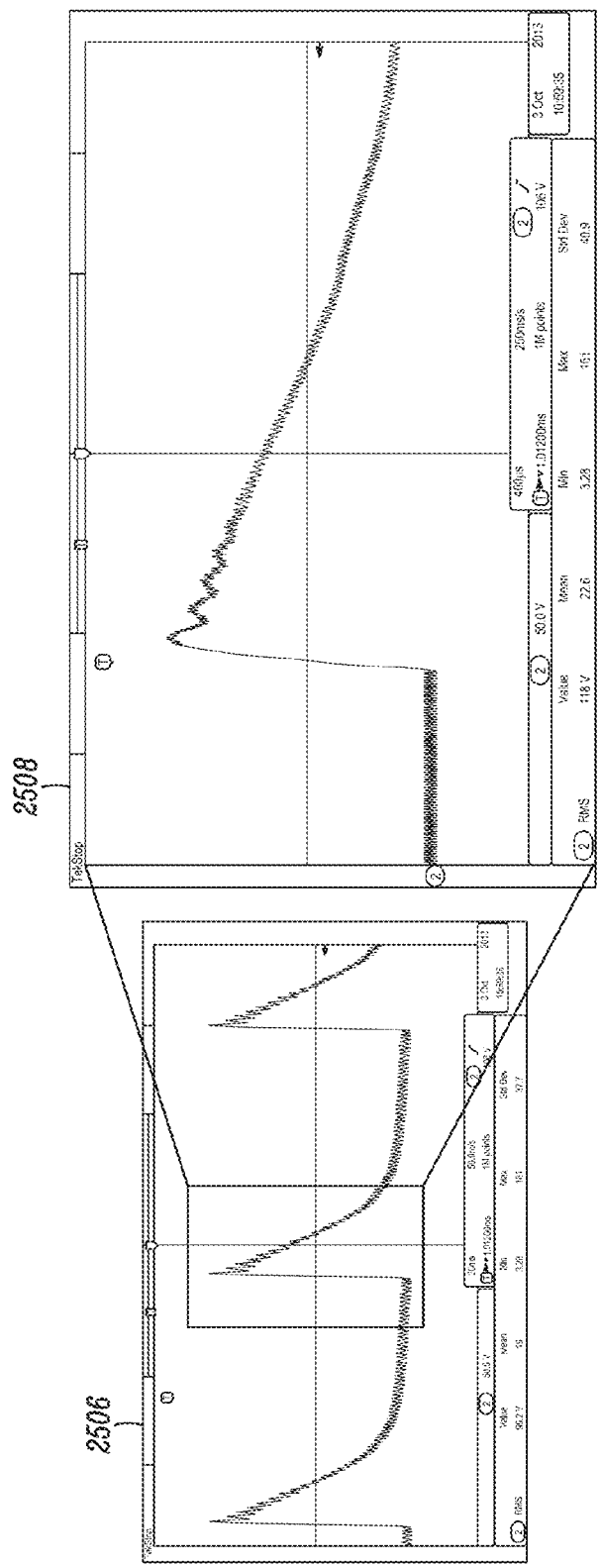
FIG. 25B is a waveform that may provide a reduction of flicker in a lamp.

Referring again to FIG. 24, but this time with R 2402 and L2 2404 included, the circuit may both reduce EMI and reduce the flicker in the LED lamp, where the resistor R 2402 is used to control when the inductor L2 2404 is bypassed. For lower resonant frequencies for the combination of L2 2404, L1 2406 and C2 2412, the impedance of L2 2404 is much lower than the resistance of R 2402. The current will therefore flow through L2 2404 and bypass R 2402. In contrast, for higher resonant frequencies for the combination of L2 2404, L1 2406 and C2 2412, the impedance of L2 2404 is much higher than the resistance of R 2402. Therefore the current will flow to R 2402 and bypass L2 2404. As a result, the R 2402 helps dampen the high resonance frequencies. FIG. 25B shows the waveform 2502 and a zoomed in version 2504 of the same, across C2 when R, L2 and L1 are 12Ω, 680 uH and 3 mH respectively, where the noisy waveform 2506, and zoomed in version 2508, from FIG. 25A becomes smoother, and thus reduces the potential for flicker in the LED lamp while maintaining the reduced EMI to meet requirements by controlling the values of R, L1, and L2.

Figure 26:
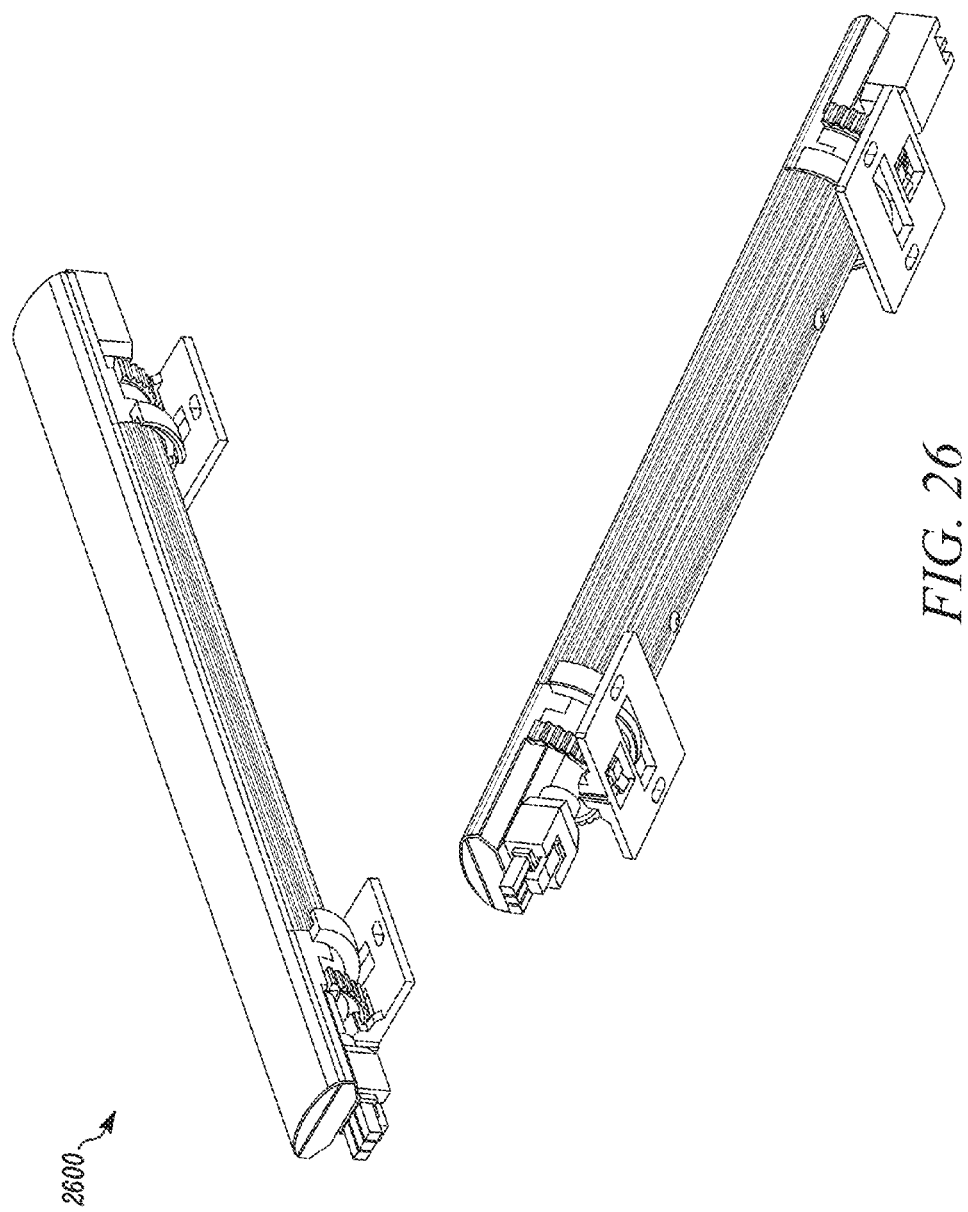
FIGS. 26-27 depict an internal linear lighting fixture in embodiments of the present invention.
Figure 27:
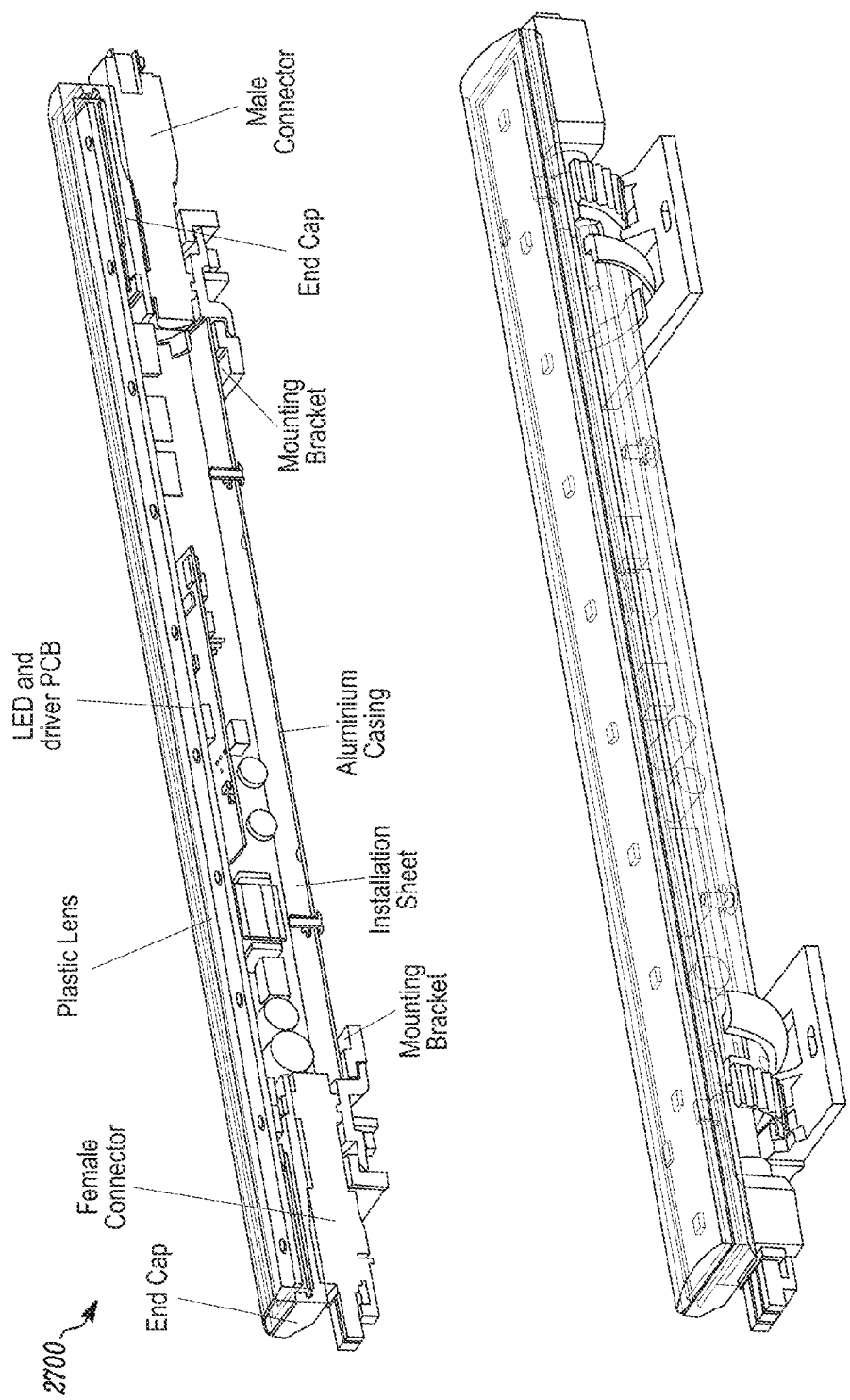
Figure 28:
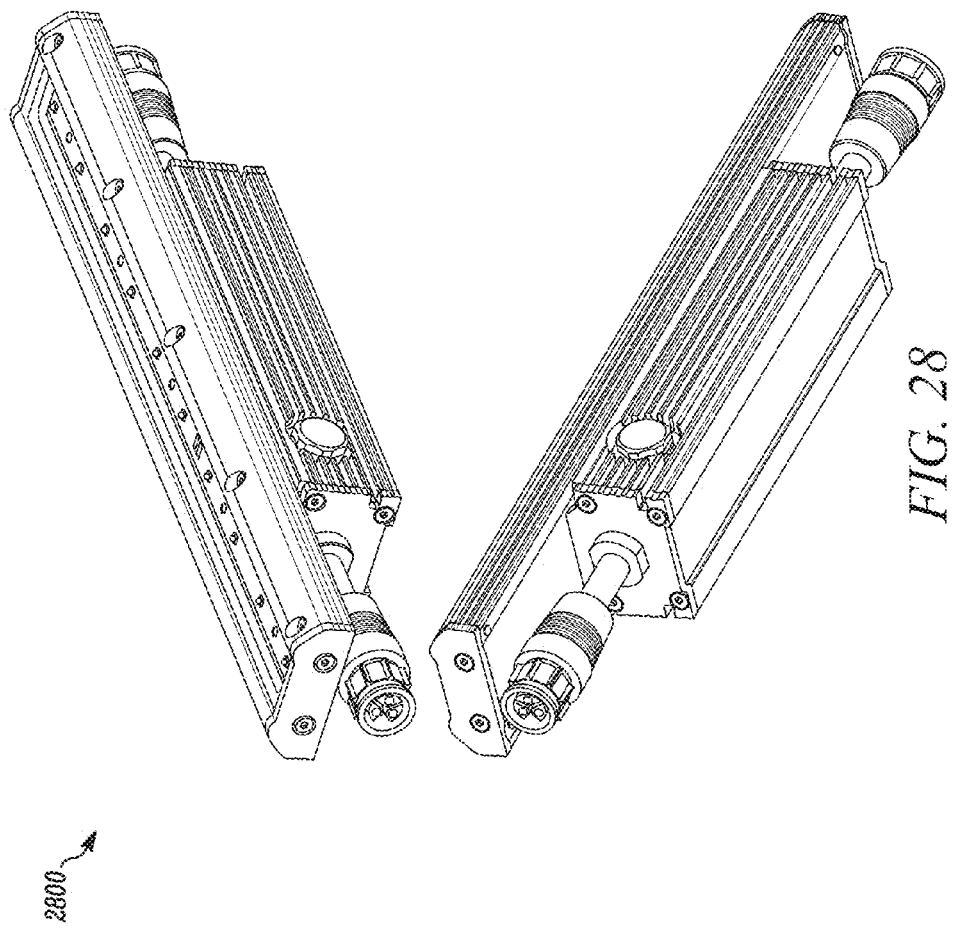
FIGS. 28-29 depict an external linear lighting fixture in embodiments of the present invention.
Figure 29:
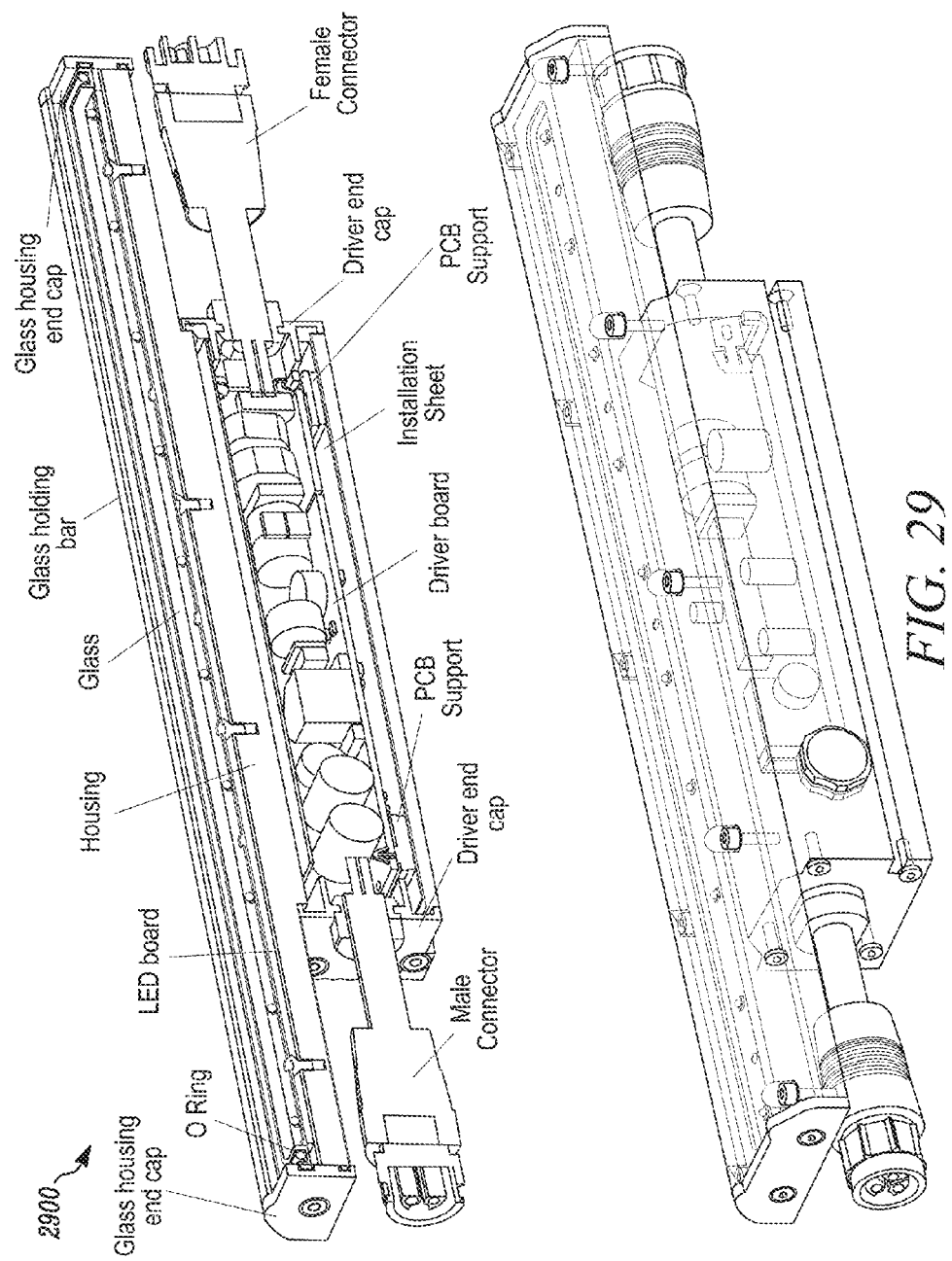
Figure 30:
FIGS. 30-31 depict a spot light lighting fixture in embodiments of the present invention.
Figure 31:
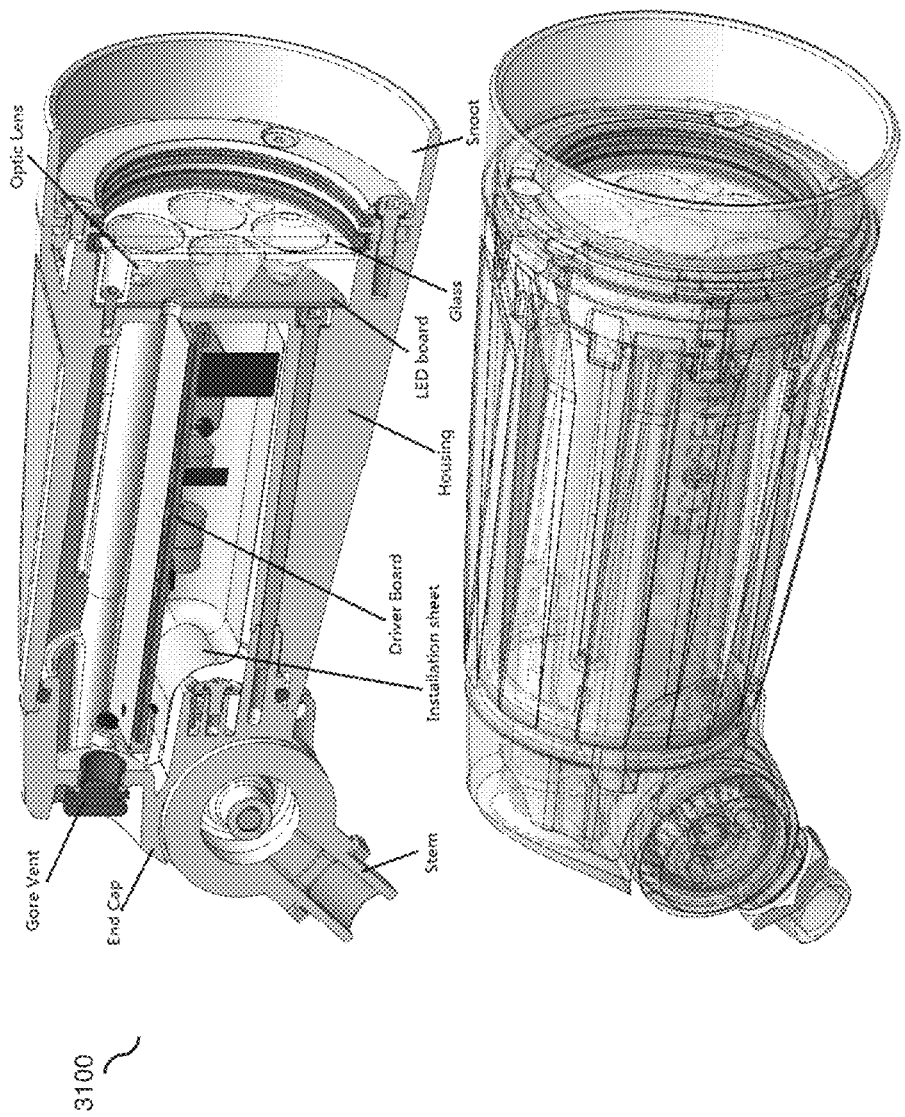

FIGS. 26-31 depict embodiment LED lighting fixtures 2600, 2700, 2800, 2900, 3000, 3100 in association with the facilities disclosed herein, where FIGS. 26-27 depict views 2600, 2700 of an internal linear LED lighting fixture, FIGS. 28-29 depict views 2800, 2900 of an external linear LED lighting fixture, and FIGS. 30-31 depict views 3000, 3100 of a spot light LED lighting fixture in embodiments of the present invention.

While only a few embodiments of the present invention have been shown and described, it will be obvious to those skilled in the art that many changes and modifications may be made thereunto without departing from the spirit and scope of the present invention as described in the following claims. All patent applications and patents, both foreign and domestic, and all other publications referenced herein are incorporated herein in their entireties to the full extent permitted by law.

All documents referenced herein are hereby incorporated by reference.

What is claimed is:

1. A system for dimming a lamp, comprising:
a lamp electronics facility with an operational duty cycle and providing power to a lamp light source, wherein the lamp electronics facility is adapted to accept a dimming input signal to control a dimming function;
wherein the lamp electronics facility includes a fast startup dimming control override facility that overrides the dimming input signal during startup of the lamp to override the dimming function through forcing the lamp electronics facility to operate with a higher than operational duty cycle to deliver higher than operational power to the lamp light source during a startup condition; and
wherein the lamp electronics facility is adapted to remove the override condition when an operational current level is reached, being that level required to produce an illumination level by the lamp light source that corresponds to the dimming input signal to the lamp light source.

2. The system of claim 1, wherein the fast startup dimming control override facility overrides the dimming input signal during the startup condition as representing a current level to the lamp light source that is less than a current required to produce the illumination level by the lamp light source that corresponds to the dimming input signal.

3. The system of claim 1, wherein the lamp light source is an LED lamp.

4. The system of claim 1, further including a dynamic RC network circuit including a capacitor and a resistor, where a value of the capacitor is dynamically changed in response to different dimming input signal conditions.

5. The system of claim 4, wherein the value of the capacitor is dynamically decreased to bypass the resistor at the startup of the lamp.

6. The system of claim 4, further including a dimmer-type detection circuit to detect use of a leading edge dimmer circuit in a dimming device, where upon detection of the leading edge dimmer circuit the dynamic RC network circuit is connected to the dimming input signal.

7. The system of claim 1, further including an active N-level bleeder that automatically selects an appropriate resistance load at different dimming current levels to maintain a holding current for a dimming device as a function of the dimming input signal.

8. The system of claim 7, further including a dimmer-type detection circuit as an auto-selector for selecting the appropriate resistance load to be more accurately based on a type of dimmer being used in the dimming device.

9. The system of claim 1, further including a flicker reduction facility including a first inductor and a capacitor in the lamp electronics facility whose values are selected so as to provide a differential mode filter function for EMI reduction, and a second inductor and a resistor in the lamp electronics facility whose values are selected in combination with the first inductor and the capacitor to decrease high frequency harmonics for flicker reduction.

10. The system of claim 1, further including a symmetrical phase cutting facility having an alternating current (A.C.) input, and a zero crossing detector, and a switching circuit, the switching circuit being adapted for alternatively generating a pair of pulse-width modulated (PWM) signals depending on a polarity of the A.C. input and being adapted to symmetrically cut the phase of the PWM signals.

11. A system for dimming a lamp, comprising:
a lamp electronics facility with an operational duty cycle and providing power to a lamp light source, wherein the lamp electronics facility is adapted to accept a dimming input signal to control a dimming function;
wherein the lamp electronics facility includes a fast startup dimming control override facility that overrides the dimming input signal during startup of the lamp to override the dimming function through forcing the lamp electronics facility to operate with a higher than operational duty cycle to deliver higher than operational power to the lamp light source during a startup condition; and
wherein the lamp electronics facility further includes a flicker reduction facility having a first inductor and a capacitor in the lamp electronics facility whose values are selected so as to provide a differential mode filter function for EMI reduction, and a second inductor and a resistor in the lamp electronics facility whose values are selected in combination with the first inductor and the capacitor to decrease high frequency harmonics for flicker reduction.

12. The system of claim 11, wherein the lamp electronics facility is adapted to remove the override condition when an operational current level is reached, being that level required to produce an illumination level by the lamp light source that corresponds to the dimming input signal to the lamp light source.

13. A method for dimming a lamp, comprising:
operating a lamp electronics facility with an operational duty cycle that provides power to a lamp light source, wherein the lamp electronics facility is adapted to accept a dimming input signal to control a dimming function;
overriding the dimming function with a fast startup dimming control override condition that overrides the dimming input signal during startup of the lamp through forcing the lamp electronics facility to operate with a higher than operational duty cycle to deliver higher than operational power to the lamp light source during a startup condition; and
removing the override condition when an operational current level is reached, being that level required to produce an illumination level by the lamp light source that corresponds to the dimming input signal to the lamp light source.

14. The method of claim 13, wherein the overriding the dimming function with the fast startup dimming control override condition includes overriding the dimming input signal during the startup condition as representing a current level to the lamp light source that is less than a current required to produce the illumination level by the lamp light source that corresponds to the dimming input signal.

15. The method of claim 13, wherein the lamp light source is an LED lamp.

16. The method of claim 13, further including providing a dynamic RC network circuit including a capacitor and a resistor, where a value of the capacitor is dynamically changed in response to different dimming input signal conditions.

17. The method of claim 16, wherein the value of the capacitor is dynamically decreased to bypass the resistor at the startup of the lamp.

18. The method of claim 16, further including providing a dimmer-type detection circuit to detect use of a leading edge dimmer circuit in a dimming device, where upon detection of the leading edge dimmer circuit the dynamic RC network circuit is connected to the dimming input signal.

19. The method of claim 13, further including providing an active N-level bleeder that automatically selects an appropriate resistance load at different dimming current levels to maintain a holding current for a dimming device as a function of the dimming input signal.

20. The method of claim 19, further including providing a dimmer-type detection circuit as an auto-selector for selecting the appropriate resistance load to be more accurately based on a type of dimmer being used in the dimming device.

21. The method of claim 13, further including providing a flicker reduction facility including a first inductor and a capacitor in the lamp electronics facility whose values are selected so as to provide a differential mode filter function for EMI reduction, and a second inductor and a resistor in the lamp electronics facility whose values are selected in combination with the first inductor and the capacitor to decrease high frequency harmonics for flicker reduction.

22. The method of claim 13, wherein the lamp electronics facility includes a symmetrical phase cutting facility having an alternating current (A.C.) input, and a zero crossing detector, and a switching circuit; and wherein the switching circuit alternatively generates a pair of pulse-width modulated (PWM) signals depending on a polarity of the A.C. input; and wherein the symmetrical phase cutting facility symmetrically cuts the phase of the PWM signals.

23. A method for dimming a lamp, comprising:
operating a lamp electronics facility with an operational duty cycle that provides power to a lamp light source, wherein the lamp electronics facility is adapted to accept a dimming input signal to control a dimming function;
overriding the dimming function with a fast startup dimming control override condition that overrides the dimming input signal during startup of the lamp through forcing the lamp electronics facility to operate with a higher than operational duty cycle to deliver higher than operational power to the lamp light source during a startup condition; and
providing a flicker reduction facility including a first inductor and a capacitor in the lamp electronics facility whose values are selected so as to provide a differential mode filter function for EMI reduction, and a second inductor and a resistor in the lamp electronics facility whose values are selected in combination with the first inductor and the capacitor to decrease high frequency harmonics for flicker reduction.

24. The method of claim 23, wherein the method further includes removing the override condition when an operational current level is reached, being that level required to produce an illumination level by the lamp light source that corresponds to the dimming input signal to the lamp light source.

* * * * *